(12) United States Patent
Garska et al.

(10) Patent No.: US 7,559,596 B2
(45) Date of Patent: Jul. 14, 2009

(54) SOFT-TOP CONVERTIBLE ROOF

(75) Inventors: Bradley R. Garska, Saline, MI (US); Christopher J. Dilluvio, Farmington Hills, MI (US)

(73) Assignee: Specialty Vehicle Acquisition Corp., Los Angeles, CA (US)

( * ) Notice: Subject to any disclaimer, the term of this patent is extended or adjusted under 35 U.S.C. 154(b) by 0 days.

(21) Appl. No.: 11/937,258

(22) Filed: Nov. 8, 2007

(65) Prior Publication Data

US 2008/0106117 A1  May 8, 2008

Related U.S. Application Data

(60) Provisional application No. 60/857,739, filed on Nov. 8, 2006.

(51) Int. Cl.
*B60J 7/10* (2006.01)
(52) U.S. Cl. .................. 296/107.09; 296/107.08; 296/118; 296/122
(58) Field of Classification Search ............ 296/107.01, 296/107.08, 107.09, 116, 117, 118, 120.1, 296/121, 122, 107.12
See application file for complete search history.

(56) References Cited

U.S. PATENT DOCUMENTS

| | | | | |
|---|---|---|---|---|
| 1,550,175 A | * | 8/1925 | Lewis | 296/116 |
| 2,000,626 A | * | 5/1935 | Votypka | 296/107.09 |
| 4,621,861 A | * | 11/1986 | Scaduto | 296/118 |
| 4,695,089 A | * | 9/1987 | Fukutomi et al. | 296/107.09 |
| 4,700,982 A | * | 10/1987 | Kuraoka et al. | 296/107.09 |
| 4,784,428 A | * | 11/1988 | Moy et al. | 296/107.07 |
| 5,429,409 A | | 7/1995 | Corder et al. | |
| 5,887,936 A | | 3/1999 | Cowsert | |
| 6,102,467 A | | 8/2000 | Laurain et al. | |
| 6,288,511 B2 | | 9/2001 | Porter et al. | |
| 6,364,395 B1 | * | 4/2002 | Halbweiss et al. | 296/107.09 |
| 6,623,065 B2 | | 9/2003 | Halbweiss et al. | |
| 2004/0155481 A1 | * | 8/2004 | Dangl et al. | 296/107.09 |
| 2006/0043758 A1 | * | 3/2006 | Powell | 296/107.08 |

FOREIGN PATENT DOCUMENTS

| | | | |
|---|---|---|---|
| JP | 61249814 A | * | 11/1986 |
| JP | 61249815 A | * | 11/1986 |
| JP | 61249817 A | * | 11/1986 |
| JP | 61268520 A | * | 11/1986 |
| JP | 61268522 A | * | 11/1986 |
| JP | 62001630 A | * | 1/1987 |
| JP | 62001631 A | * | 1/1987 |

* cited by examiner

*Primary Examiner*—Glenn Dayoan
*Assistant Examiner*—Paul A Chenevert
(74) *Attorney, Agent, or Firm*—Harness, Dickey & Pierce, P.L.C.

(57) ABSTRACT

A convertible roof includes a segmented rearmost roof bow that has a length that can change during the retraction and extension process. The rearmost roof bow can be segmented such that the pieces can move relative to one another to shorten a length of the rearmost roof bow when being stowed. When in the fully raised and operative position, the sections of the segmented rearmost roof bow can be aligned and form a roof bow having an operative length. In the retracted state, the sections of the segmented rearmost roof bow can be moved relative to one another such that they are no longer aligned and have a length that is less than the operative length when aligned.

26 Claims, 23 Drawing Sheets

SOFT-TOP CONVERTIBLE ROOF

CROSS-REFERENCE TO RELATED APPLICATIONS

This application claims the benefit of U.S. Provisional Application No. 60/857,739, filed on Nov. 8, 2006. The disclosure of the above application is incorporated herein by reference.

BACKGROUND AND SUMMARY OF THE INVENTION

The present invention relates to convertible roofs and, more particularly, to convertible roofs with a shortening rearmost roof bow.

Traditional soft-top convertible roofs for automotive vehicles typically employ three, four or five roof bows, having an inverted U-shape spanning transversely across the vehicle for supporting a vinyl, canvas or polyester fabric pliable roof cover. A number one roof bow is mounted to a pair of front roof rails and is typically latched to a stationary front header panel of the automotive vehicle body disposed above the front windshield. A number two roof bow is typically mounted to either the front roof rails or to a pair of center roof rails which are pivotally connected to the front roof rails. Furthermore, a number three, four and any additional optional roof bows are commonly mounted to either the center pair of roof rails or to a pair of rear roof rails which are pivotally coupled to the center roof rails. The rearmost roof bow can reside on top of the vehicle body when the convertible roof is in the raised operative position. In some instances, the rearmost roof bow can reside on top of a movable tonneau cover that can be opened and closed to allow the convertible roof to move between a raised and retracted position. The roof cover can also have a hard or rigid portion along with the pliable portion. For example, reference should be made to U.S. Pat. No. 5,429,409, entitled "Convertible Top", which is incorporated by reference herein.

Most traditional convertible roofs are stowed in a bootwell or stowage compartment that is located aft of a passenger compartment in the vehicle. A boot or tonneau cover is then used to cover the bootwell and conceal the convertible roof from view and/or protect the stowed roof from the environment. Optionally, a portion of the convertible roof can be visible when in the stowed position and provide a desired appearance for the vehicle.

Traditional soft-top convertible roofs, such as those discussed above, can present a packaging (stowing) difficulty. In some vehicles, it may be desired to have a particular exterior appearance. The exterior appearance may require the rearmost roof bow to extend a significant length rearwardly along the vehicle body. This length of the rearmost roof bow can present packaging difficulty in that the rearmost bow must be stowed in the stowage compartment along with the other components of the convertible roof. Additionally, the packaging difficulty can be more pronounced when a convertible roof is desired to be used on a larger vehicle (vehicle having front and rear seating areas).

The available space for the stowage compartment in a vehicle, however, may be at a premium. That is, while it is desirable to provide a vehicle with a convertible roof, it is also desirable to provide sufficient storage space in the vehicle for use in storing objects other than the convertible roof. Thus, it would be advantageous to reduce the packaging space required to stow the convertible roof while increasing the available space for other purposes, such as maintaining or increasing the size of the passenger compartment and/or the size of the general storage area or trunk of the vehicle when produced with a convertible roof.

In accordance with the present teachings, a convertible roof is provided which includes a segmented rearmost roof bow that has a longitudinal length that can change during the retraction and extension process. The rearmost roof bow can be segmented such that the pieces can move relative to one another to shorten a length of the rearmost roof bow when being stowed. When in the fully raised and operative position, the sections of the segmented rearmost roof bow can be aligned and form a roof bow having an operative length. In the retracted state, the sections of the segmented rearmost roof bow can be moved relative to one another such that they are no longer aligned and have a length that is less than the operative length when aligned.

In one aspect of the present teachings, the retraction of the convertible roof is a two-step process. In the first step, the sections of the segmented rearmost roof bow are moved relative to one another to take an adjacent position and shorten the length. This motion can be accomplished while the rest of the top stack mechanism remains stationary. In the second step of the retraction process, the sections of the segmented roof bow can be held in the adjacent position while the rest of the top stack mechanism and the segmented roof bow retracts into the stowage well. In another aspect of the present teachings, the segmented sections of the rearmost roof bow move from an aligned position to a shortened, adjacent position as the top stack mechanism retracts into the stowage well. In this teaching, the segmented sections move relative to one another as the rear roof rail moves. Thus, in this aspect, the shortening of the rearmost roof bow can be accomplished in conjunction with the rotation of the rearmost roof rail between the raised and stowed positions.

This shortening of the rearmost roof bow advantageously reduces the packaging space required for a convertible roof employing such a segmented rearmost roof bow. Thus, in a convertible roof according to the present teachings, the length of the rearmost roof bow is shortened during the retraction process to allow the convertible roof to stow more compactly. The ability to shorten the length of the rearmost roof bow during the retraction process enables a longer rearmost roof bow to be implemented when the convertible roof is in the raised operative position to provide an aesthetically desirable appearance. For example, the use of an extended length rearmost roof bow can facilitate the appearance of a fastback vehicle wherein the roof line extends rearwardly a significant distance toward the end of the vehicle.

Additional objects, advantages and features of the present invention will become apparent from the following description and the pending claims, taken in conjunction with the accompanying drawings. It should be understood that the detailed description and the specific examples are intended for purposes of illustration only and are not intended to limit the scope of the teachings.

DRAWINGS

The drawings described herein are for illustration purposes only and are not intended to limit the scope of the present teachings in any way.

DETAILED DESCRIPTION

Figure 1:
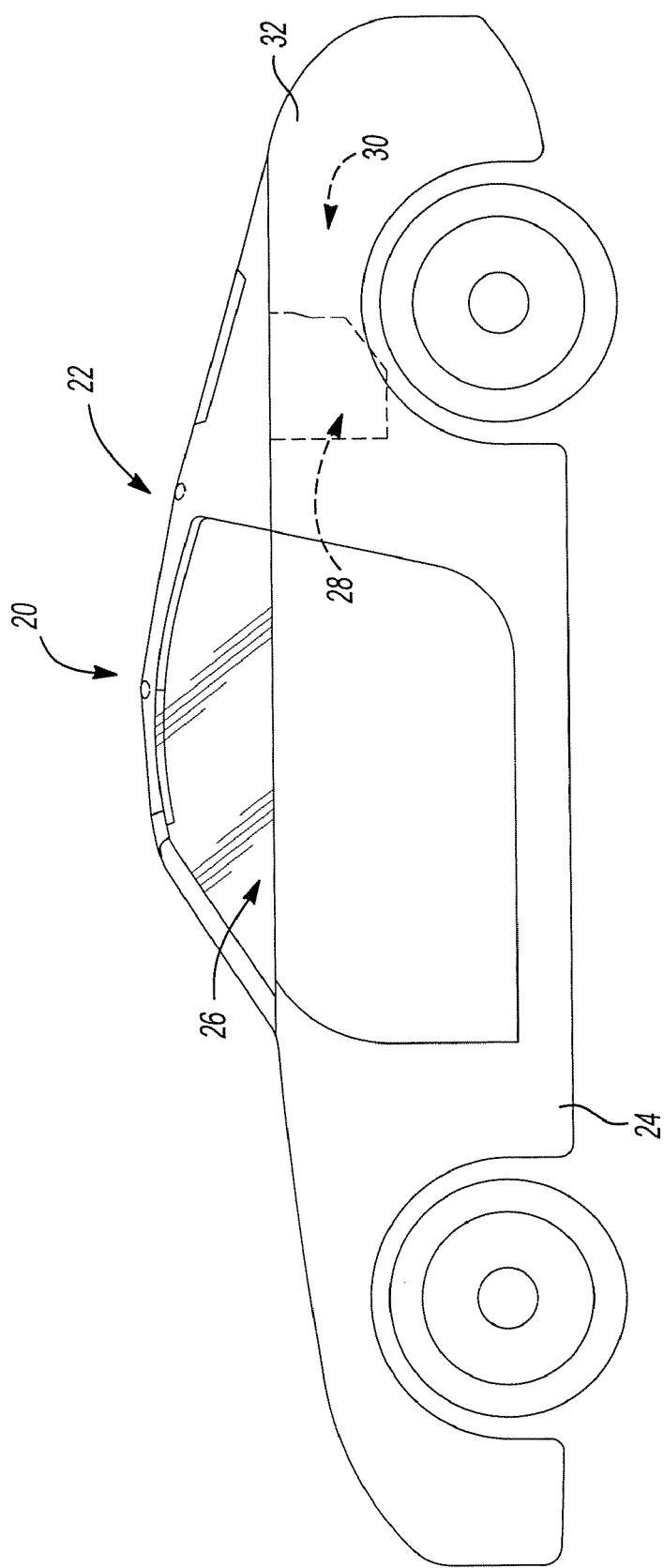
FIG. 1 is a side view of a vehicle having a convertible roof according to the present teachings.

The following description is merely exemplary in nature and is not intended to limit the present disclosure, application, or uses.

In the figures, the convertible roof and the associated top stack mechanism are shown symmetrical about a longitudinal, fore-and-aft center line (not shown) of the vehicle. The center line, thus, also serves as a longitudinal center line for the convertible roof and the top stack mechanism and its associated linkages and components. The top stack mechanism includes right and left roof linkages on the respective right and left sides of the vehicle. For brevity, at times only one side of the top stack mechanism and the convertible roof may be shown and/or discussed. However, it should be understood that the other side linkages are also provided as part of the top stack mechanism and the convertible roof and are mirrored images of the side depicted and/or discussed. Also, when using the terms "fore" and "aft," "front" and "back," and "forward" and "rearward" in describing the movement and components of the top stack mechanism and the convertible roof, such reference refers to the orientation of the components when the top stack mechanism and the convertible roof are in the fully raised operative position.

Referring to FIGS. 1-6, a vehicle 20 having a convertible roof 22 according to the present teachings is shown. Vehicle 20 has a body 24 and a passenger compartment 26. A stowage or boot well 28 is disposed aft of passenger compartment 26 and can receive convertible roof 22 when in the retracted position. A storage space 30 is aft of stowage well 28 and can be accessed from a rear of vehicle 20. A deck lid 32 can allow access to storage space 30 from a rear of vehicle 20. A tonneau cover 34 (FIGS. 4-6) can be utilized on vehicle 20 in conjunction with convertible roof 22 to provide a desired closeout and aesthetically pleasing appearance for vehicle 20 having convertible roof 22. Tonneau cover 34 can move between raised and lowered positions to allow access to stowage well 28 and the retraction and extension of convertible roof 22.

Figure 2:
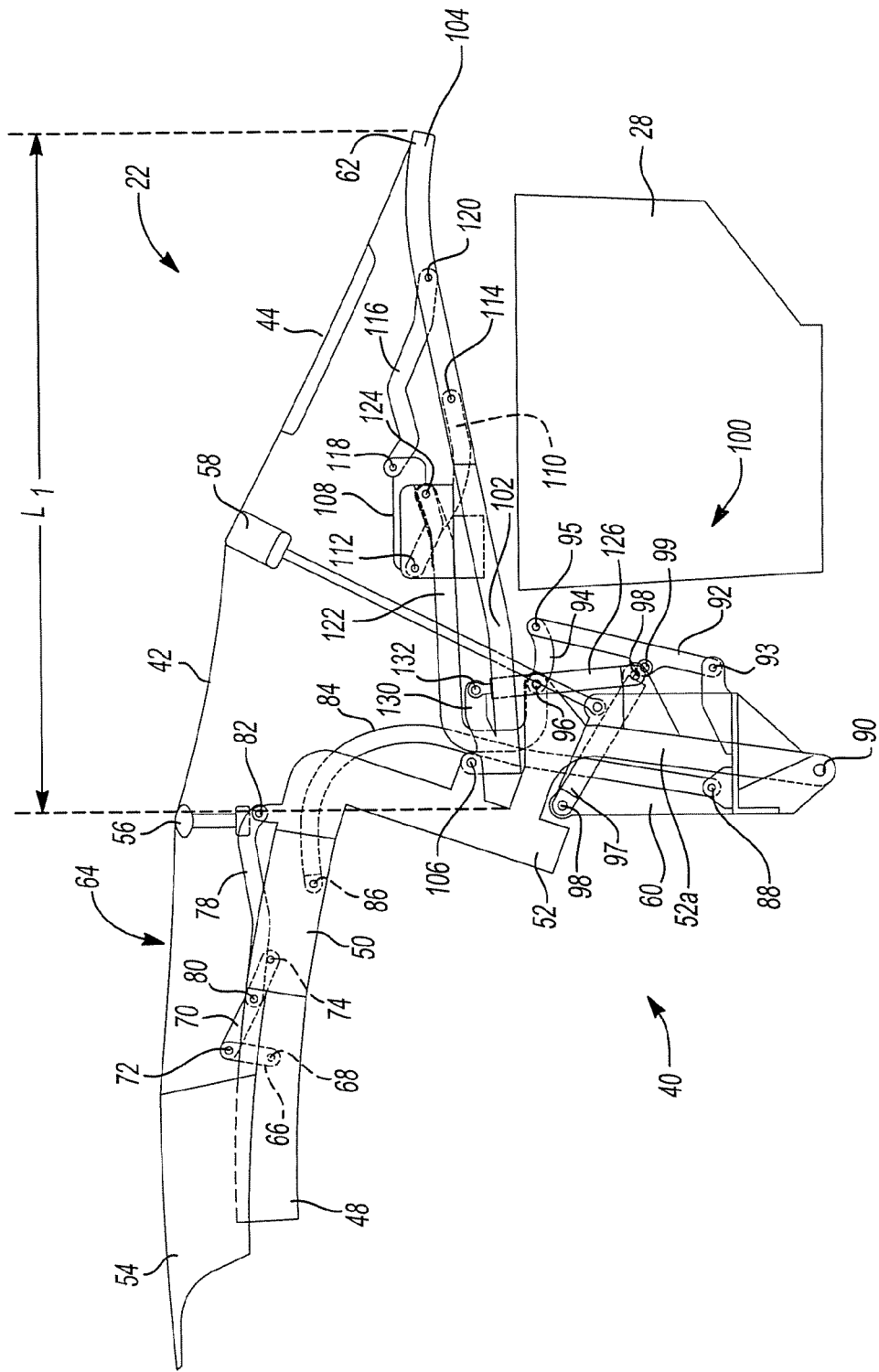
FIG. 2 is a fragmented side view of the convertible roof of FIG. 1 with a first embodiment of a top stack mechanism according to the present teachings in the fully raised and operative position.
Figure 3:
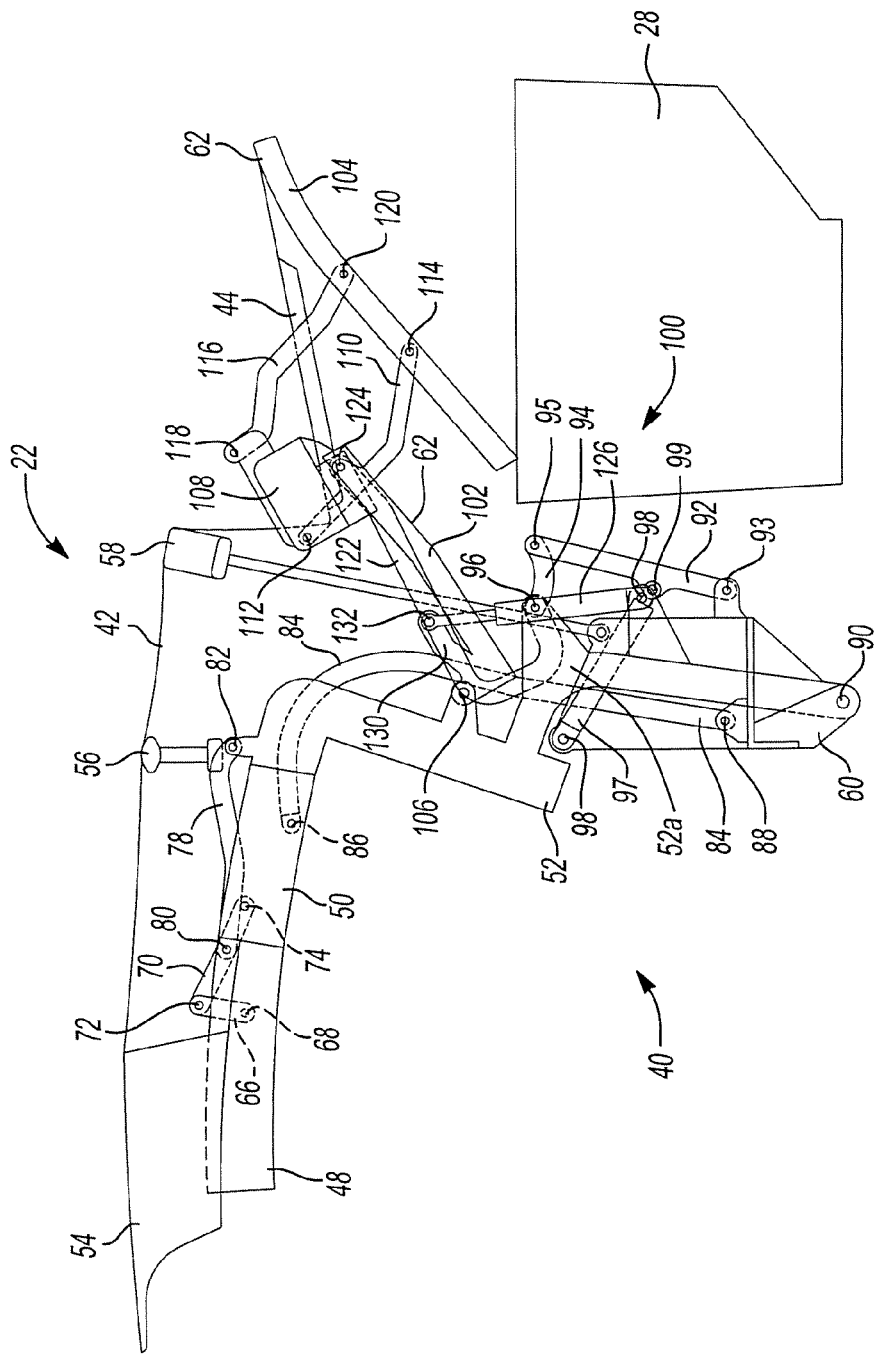
FIGS. 3-4 are fragmented side views of the convertible roof of FIG. 2 showing the first stage of the retraction process wherein the rearmost roof bow shortens in length as it moves from the operative position to a generally vertical position.
Figure 4:
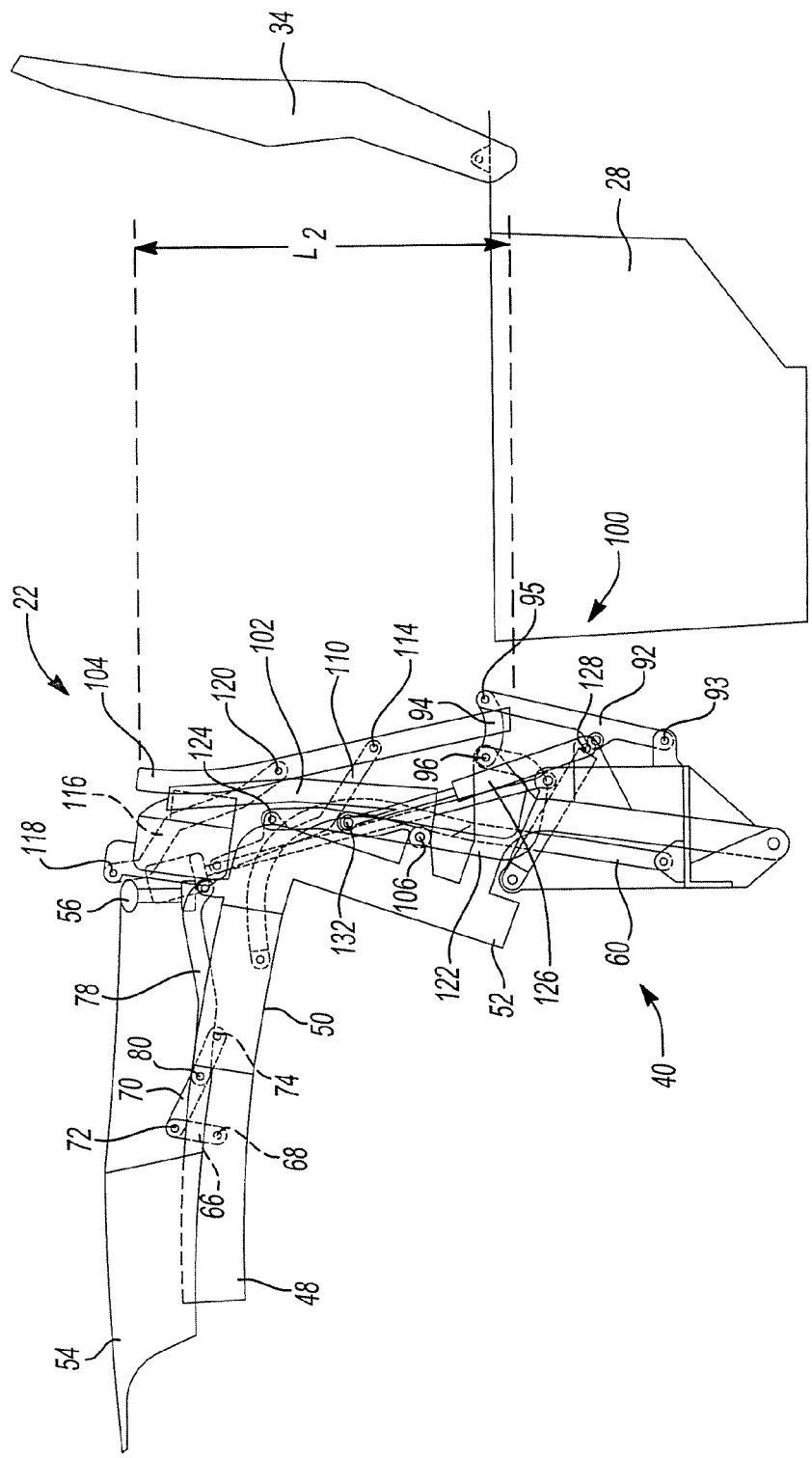
Figure 5:
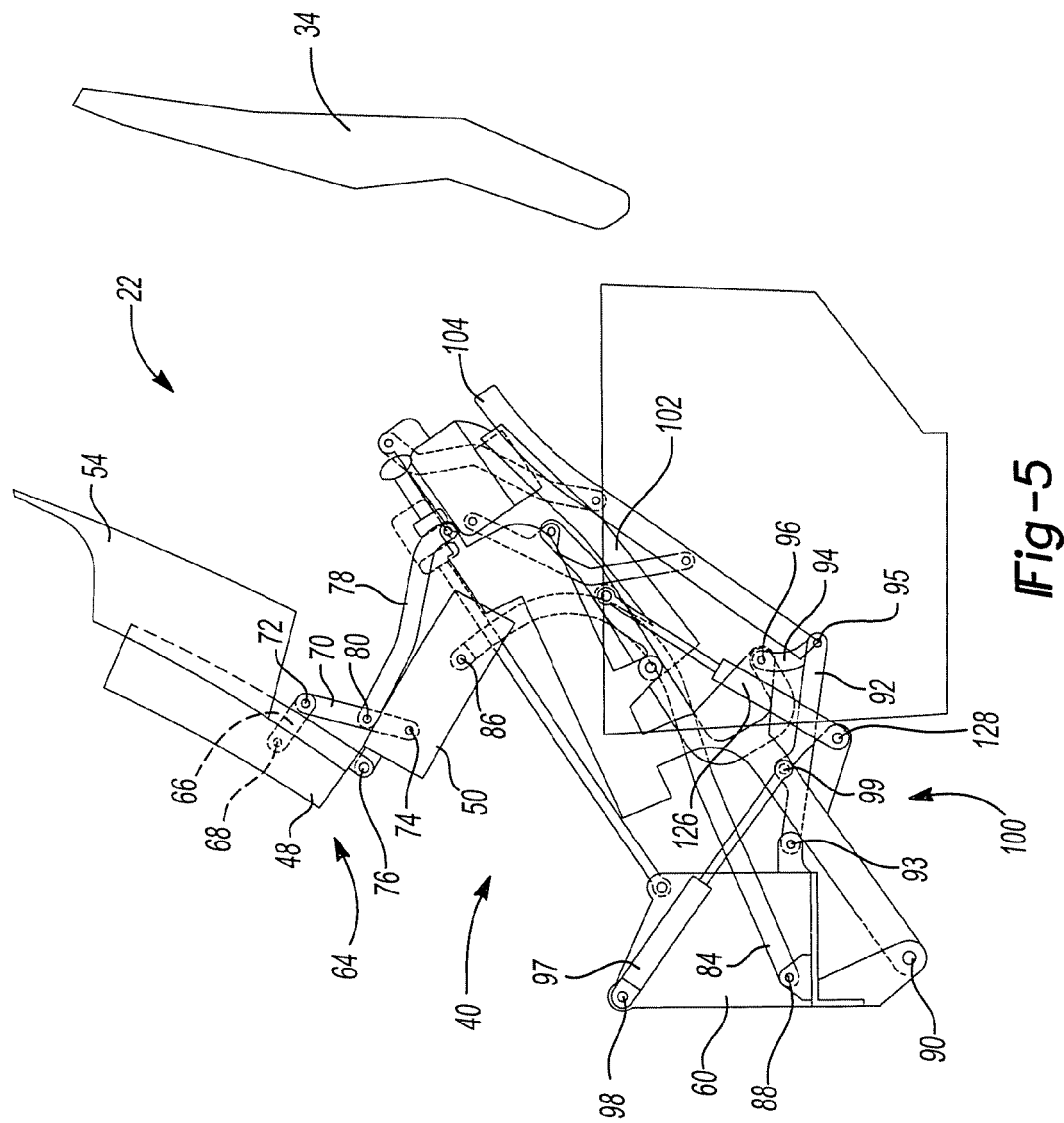
FIGS. 5 and 6 are fragmented side views of the convertible roof of FIG. 2 showing the second stage of the retraction process wherein the convertible roof retracts into the stowage well.
Figure 6:
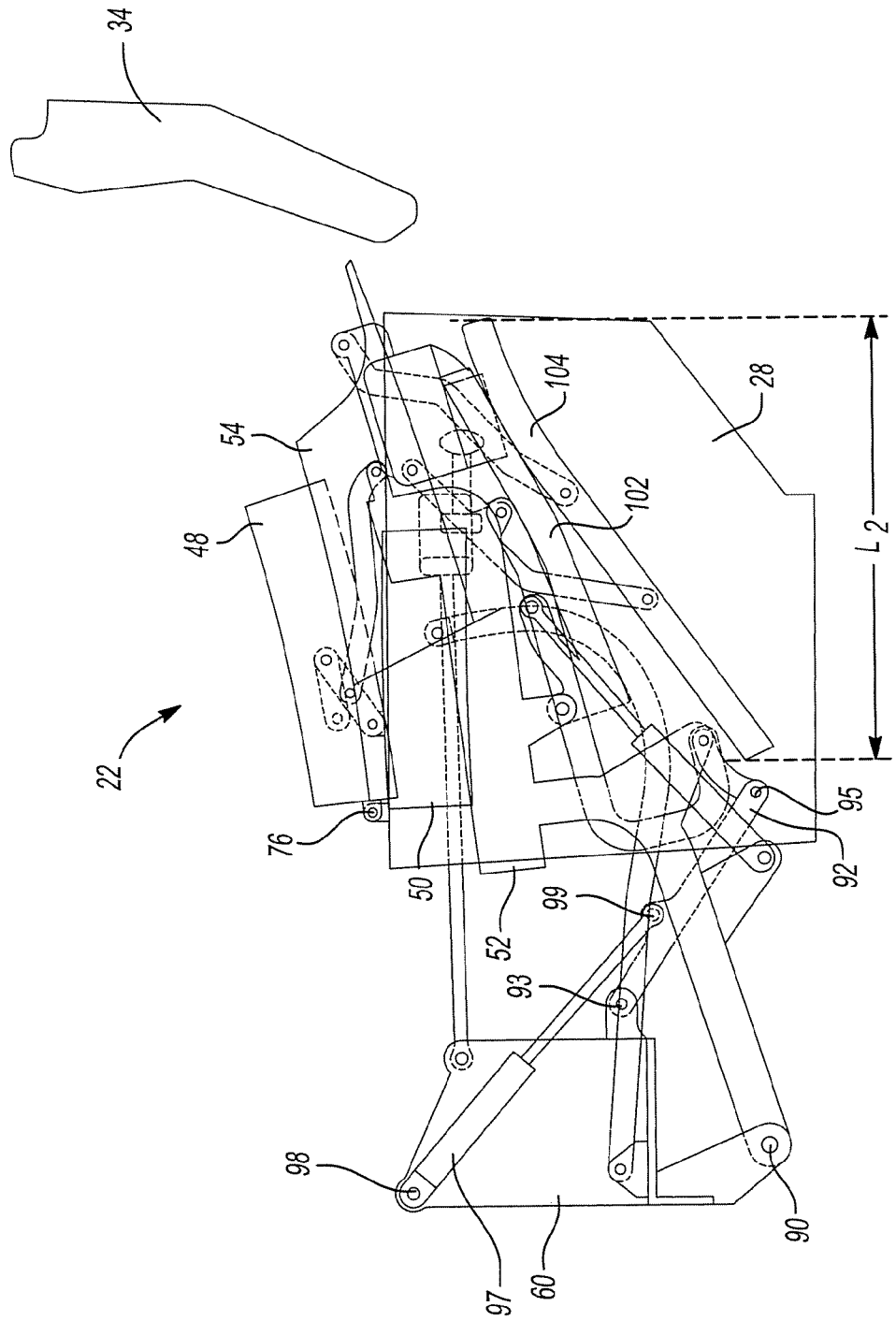

Convertible roof 22 is of the type utilizing a folding or top stack mechanism 40 and a roof cover 42 (shown in FIGS. 1 and 2) and is operable between a fully raised and operative position, as shown in FIGS. 1 and 2, through intermediate positions, such as those shown in FIGS. 3-5, to a fully stowed position, as shown in FIG. 6. Roof cover 42 can be made from a pliable material, such as vinyl, canvas, or a polyester fabric. If desired, roof cover 42 can include a hard or rigid portion that, optionally, can be covered by the same material that comprises the soft portion of the cover to give a uniform appearance. A backlite 44 is attached to roof cover 42 and is not directly coupled to top stack mechanism 40. For example, reference should be made to U.S. Pat. No. 5,887,936, entitled "Backlite System for Use in an Automotive Vehicle Convertible Roof," by Cowsert, and U.S. Pat. No. 6,102,467, entitled "Backlite Retention System for Use in an Automotive Vehicle Convertible Roof," by Laurain et al., both of which are herein incorporated by reference. Backlite 44 can be made of either a rigid material, such as glass, or a pliable transparent material, such as vinyl.

Top stack mechanism 40 includes a pair of front roof rails 48, center roof rails 50, and rear roof rails 52. A forwardmost or number one roof bow 54 is attached to front roof rails 48 and extends transversely across vehicle 20 adjacent a front header above the front windshield. A number two roof bow 56 is pivotally coupled to an upper portion of rear roof rails 52. A third roof bow 58 is pivotally coupled to a bracket 60 affixed to vehicle 20. A fourth or rearmost roof bow 62 is pivotally coupled to rear roof rail 52, as described below. In convertible roof 22, number one roof bow 54 is shown as extending longitudinally along front roof rails 48 a significant distance. It should be appreciated that number one roof bow 54 can be smaller (or larger) than that shown and an additional roof bow can be installed between first and second roof bows 54, 56.

Front roof rail 48 is pivotally coupled to center roof rail 50 by a four-bar linkage assembly 64. Linkage assembly 64 includes a first link 66 having one end pivotally coupled to front roof rail 48 at pivot 68 while an opposite end is coupled to an end of a second link 70 at pivot 72. The opposite end of second link 70 is pivotally coupled to center roof rail 50 at pivot 74. Additionally, a rear portion of front roof rail 48 is pivotally coupled to a front portion of center roof rail 50 at pivot 76 (shown in FIGS. 5 and 6). Linkage assembly 64 includes front roof rail 48, first link 66, second link 70, and center roof rail 50 and is defined by pivots 68, 72, 74, 76.

Linkage assembly 64 allows front roof rail 48 to pivot relative to center roof rail 50 about pivot 76 during the raising and lowering of convertible roof 22. To drive this motion, one end of a control link 78 is pivotally coupled to an intermediate portion of second link 70 at pivot 80 while an opposite end of control link 78 is pivotally coupled to rear roof rail 52 at pivot 82. Additionally, one end of a balance link 84 is pivotally coupled to center roof rail 50 at pivot 86 while an opposite end of balance link 84 is pivotally coupled to bracket 60 at pivot 88. An arm 52a of rear roof rail 52 is pivotally coupled to bracket 60 at pivot 90. This arrangement allows the movement of rear roof rail 52 to be driven about pivot 90 to raise and lower convertible roof 22, as described below.

The rotation of rear roof rail 52 about pivot 90 also drives movement of front and center roof rails 48, 50 relative to rear roof rail 52. One end of a drive link 92 is pivotally coupled to bracket 60 at pivot 93 while an opposite end of drive link 92 is pivotally coupled to an end of a connector link 94 at pivot 95. The opposite end of connector link 94 is pivotally coupled to arm 52a of rear roof rail 52 at pivot 96. This arrangement forms a four-bar linkage assembly that controls the motion of rear roof rail 52 about pivot 90 and includes arm 52a of rear roof rail 52, bracket 60, drive link 92, and connector link 94 and is defined by pivots 90, 93, 95, and 96.

One end of an automatic actuator 97 is pivotally coupled to bracket 60 at pivot 98 while an opposite end of actuator 97 is pivotally coupled to an intermediate portion of drive link 92 at pivot 99. Actuator 97 can extend and retract to cause convertible roof 22 to move between the raised and stowed positions, as described below. Actuator 97 can be a fluidic cylinder, such as a hydraulic or pneumatic cylinder.

In convertible roof 22, rearmost roof bow 62 is coupled to top stack mechanism 40 with a multi-link rear bow mechanism 100 which is pivotally connected to rear roof rail 52 at two locations. Rear bow mechanism 100 enables rearmost roof bow 62 to move between a generally horizontal, operative position having a fore-and-aft length $L_1$, as shown in FIG. 2, to a shortened and upright position, as shown in FIG. 4, and to be held in the shortened position while convertible roof 22 moves from the position shown in FIG. 4 to the fully stowed position, as shown in FIG. 6. In the stowed position, rearmost roof bow 62 has a shortened fore-and-aft length $L_2$ which enables a more compact packaging of convertible roof 22. The rear bow mechanism 100 works in conjunction with top stack mechanism 40 to impart a two-step retraction and extension process to move convertible roof 22 between the raised and stowed positions.

Rearmost roof bow 62 is a segmented roof bow that can separate to change its length between $L_1$ and $L_2$ during the retraction and extension processes. This is accomplished by moving front and rear portions 102, 104 of segmented rearmost roof bow 62 relative to one another. One end of front portion 102 is pivotally coupled to rear roof rail 52 at pivot 106 while an opposite end of front portion 102 includes an arm or bracket 108 extending therefrom. One end of an input link 110 is pivotally coupled to arm 108 at pivot 112 while an opposite end is pivotally coupled to an intermediate section of rear portion 104 at pivot 114. One end of a follower link 116 is pivotally coupled to arm 108 at pivot 118 while an opposite end of follower link 116 is pivotally coupled to an intermediate section of rear portion 104 at pivot 120 rearward of pivot 114. Front portion 102, input link 110, rear portion 104, and follower link 116 thereby form a four-bar linkage assembly defined by pivots 112, 114, 120, 118. This four-bar linkage assembly enables the movement of rear portion 104 relative to front portion 102 to change the length of segmented rearmost roof bow 62.

One end of a J-shaped balance link 122 is pivotally coupled to an intermediate section of input link 110 at pivot 124 while an opposite end of balance link 122 is pivotally coupled to arm 52a of rear roof rail 52 at pivot 96. Balance link 122 thereby shares pivot 96 with connector link 94. Balance link 122 limits the movement of the four-bar linkage assembly interconnecting front and rear portions 102, 104 of segmented rearmost roof bow 62.

One end of an automatic actuator 126 is pivotally coupled to bracket 60 at pivot 128 (FIG. 5) while an opposite end of actuator 126 is pivotally coupled to a projection 130 that extends rearwardly from a front end of front portion 102 at pivot 132. Actuator 126 can extend and retract to cause rear bow mechanism 100 to move between the operative position, shown in FIG. 2, through intermediate positions, such as that shown in FIG. 3, to its retracted position, as shown in FIG. 4. Actuator 126 can be a fluidic cylinder, such as a hydraulic or pneumatic cylinder.

In operation, convertible roof 22 is movable between the raised, operative position, shown in FIGS. 1 and 2, to the retracted position, as shown in FIG. 6, in a two-step process. In the first step, roof rails 48, 50, 52 remain stationary while rear bow mechanism 100 is driven by actuator 126 to move segmented rearmost roof bow 62 from the generally horizontal, operative position, as shown in FIG. 2, through intermediate positions, such as the one shown in FIG. 3, to a raised and shortened position, as shown in FIG. 4. With rear roof rail 52 stationary, pivots 128, 96, and 106 are virtual fixed ground pivots during the first step of the process. Segmented rearmost roof bow 62 is generally vertically oriented when in the raised and shortened position.

To move segmented rearmost roof bow 62, actuator 126 extends in length which drives counterclockwise rotation of front portion 102 about pivot 106. This movement also drives rotation of balance link 122 counterclockwise about pivot 96. The counterclockwise rotation of front portion 102 and balance link 122 cause input link 110 to rotate clockwise about pivot 112. The clockwise rotation of input link 110 causes follower link 116 to rotate clockwise about pivot 118. The clockwise rotation of input and follower links 110, 116 cause rear portion 104 of segmented rearmost roof bow 62 to also rotate clockwise relative to arm 108 and to move forwardly relative to front portion 102. With this movement, rear portion 104 moves to a position generally adjacent front portion 102 such that the overall length between the frontmost and rearmost end of either front or rear portions 102, 104 is shortened to length $L_2$, as shown in FIGS. 4 and 6. Actuator 126 can remain active to maintain segmented rearmost roof bow 62 in the shortened position during the second stage of the retraction process. With segmented rearmost roof bow 62 in the raised position, tonneau cover 34 can be moved, either automatically or manually, from its generally horizontal, operative position to a generally vertical raised position thereby allowing access to stowage well 28.

During the second stage of the retraction process, the segmented rearmost roof bow 62 remains in its shortened position relative to rear roof rail 52, as shown in FIGS. 4-6. During the second step of the retraction process, number one roof bow 54 is unlatched from the front header of vehicle 20 and actuator 97 extends which drives clockwise rotation of drive link 92 about pivot 93. This clockwise rotation pulls connector link 94 rearwardly and downwardly which causes rear roof rail 52 to rotate clockwise about pivot 90. The clockwise rotation of rear roof rail 52 causes control link 78 to drive linkage assembly 64 and pivot front roof rail 48 clockwise relative to center roof rail 50 about pivot 76. Additionally, this motion also causes balance link 84 to rotate clockwise about pivot 88 and pull center roof rail 50 rearwardly and counterclockwise about pivot 86 relative to rear roof rail 52. Actuator 97 continues to extend until the entire convertible roof 22 is in the fully stowed position, as shown in FIG. 6. As shown in FIG. 6, the length $L_2$ of segmented rearmost roof bow 62 fits easily within stowage well 28. Tonneau cover 34 can be moved back to an operative position once convertible roof 22 is in its fully stowed position. To move convertible roof 22 from its stowed position to its raised position, steps 1 and 2 are performed in the opposite sequence.

Figure 7:
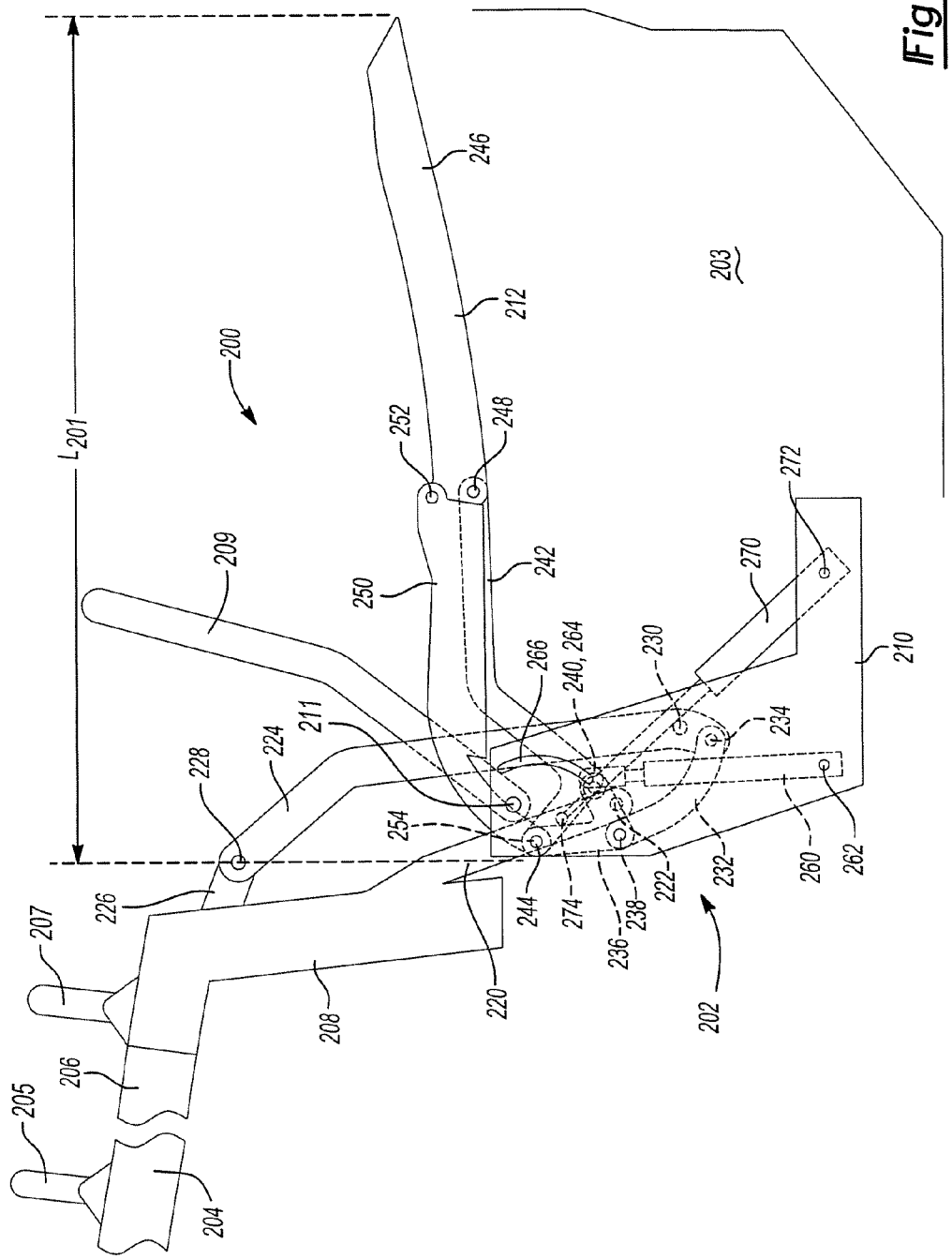
FIG. 7 is a fragmented side view of the convertible roof of FIG. 1 with a second embodiment of a top stack mechanism according to the present teachings in the fully raised and operative position.
Figure 8:
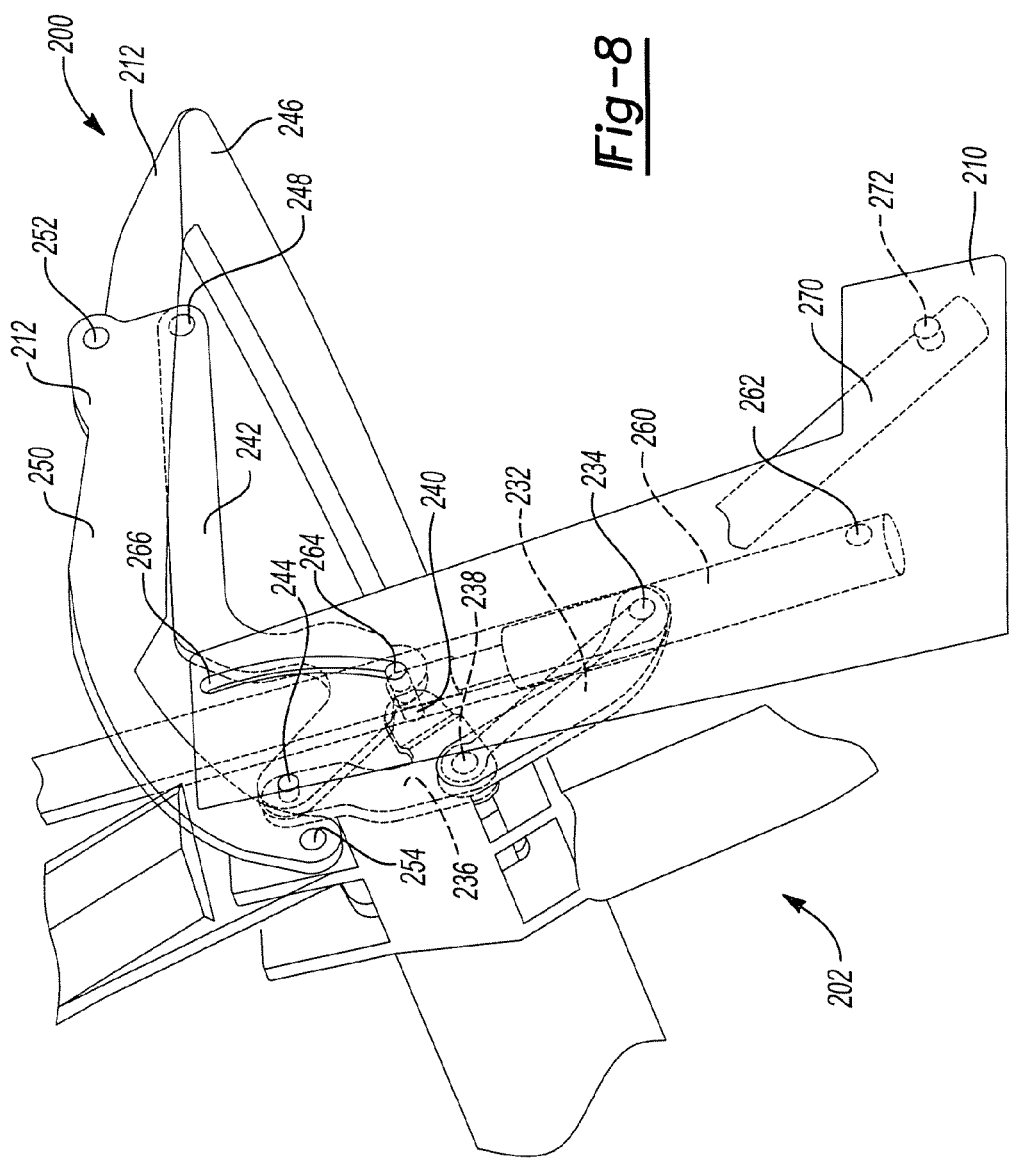
FIG. 8 is a fragmented perspective view of the top stack mechanism of the convertible roof of FIG. 7.
Figure 13:
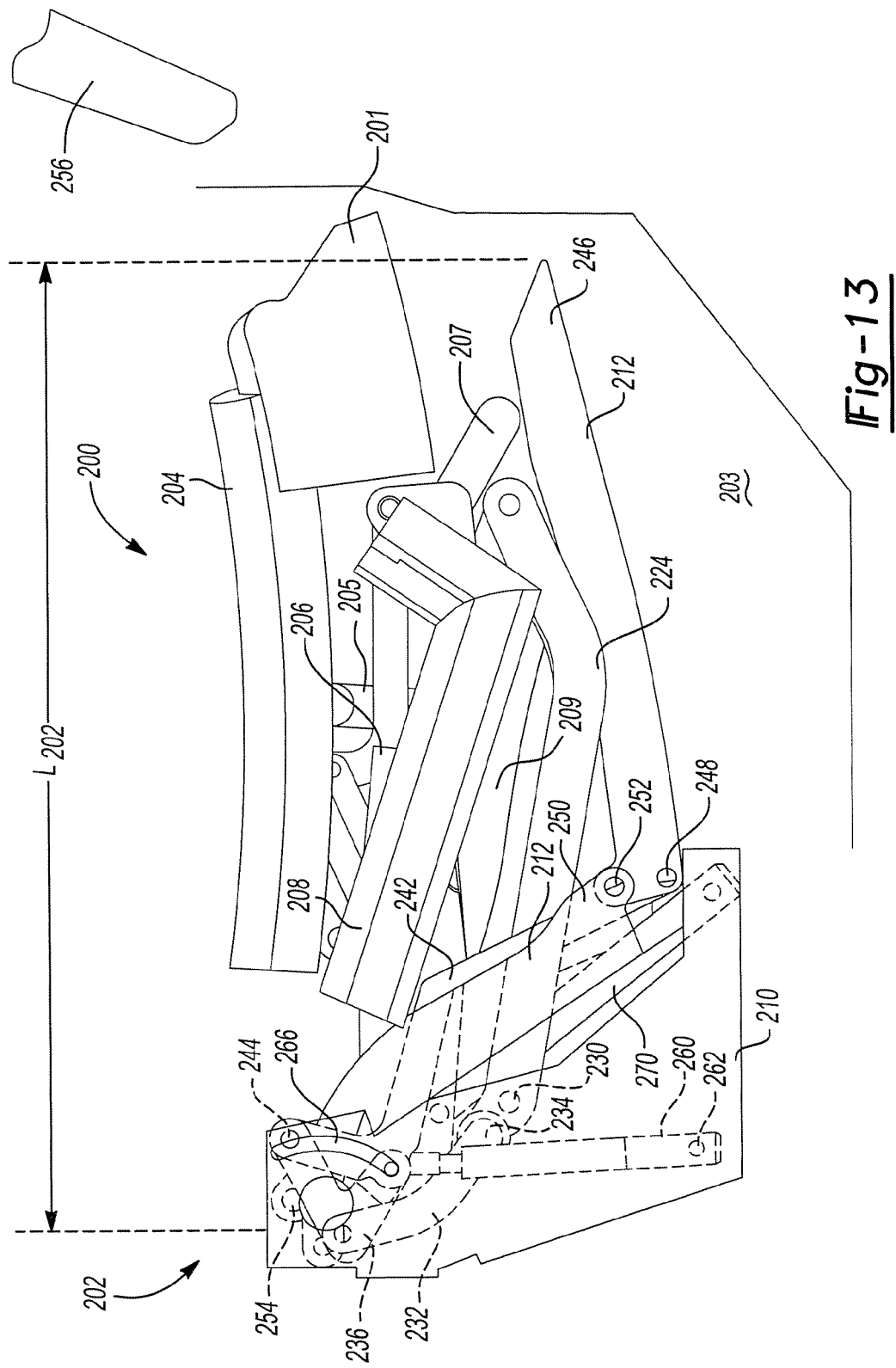
FIG. 13 is a fragmented side view of the convertible roof of FIG. 7 in the stowed position.

Referring now to FIGS. 7-13, a second convertible roof 200 according to the present teachings is partially shown. Convertible roof 200 includes a top stack mechanism 202 that can drive movement of convertible roof 200 from a raised and operative position, as shown in FIGS. 7 and 8, through intermediate positions, such as those shown in FIGS. 10-12, to a stowed position in stowage well 203, as shown in FIG. 13. Top stack mechanism 202 includes a pair of front roof rails 204, center roof rails 206, and rear roof rails 208. A plurality of roof bows can extend between the roof rails and/or be pivotally coupled to a fixed bracket 210 that is coupled to the vehicle upon which convertible roof 200 is employed. For example, a number one or frontmost roof bow 201 (FIG. 13) can extend between front roof rails 204, a number two roof bow 205 can extend between front roof rails 204, a number three roof bow 207 can extend between rear roof rails 208 and a number four roof bow 209 can extend between brackets 210 and rotate about pivot 211.

Convertible roof 200 includes a segmented rearmost roof bow 212 that has a length that can change to reduce the packaging space required to stow convertible roof 200 when in the retracted position. Specifically, segmented rearmost roof bow 212 can have a first operative fore-and-aft length $L_{201}$, as shown in FIG. 7, and a second reduced stowed fore-and-aft length $L_{202}$, as shown in FIG. 13. In convertible roof 200, the changing of the length of segmented rearmost roof bow 212 occurs during the movement of rear roof rail 208 between the raised and stowed positions, as described below.

Rear roof rail 208 has a downwardly and rearwardly extending arm 220 that is pivotally coupled to bracket 210 at pivot 222. Thus, movement of rear roof rail 208 is limited to rotational movement about pivot 222. One end of a balance link 224 is pivotally coupled to a rearwardly extending arm 226 of center roof rail 206 at pivot 228. An intermediate portion of balance link 224 adjacent the opposite end is pivotally coupled to bracket 210 at pivot 230. Movement of balance link 224 is thereby limited to rotational movement relative to bracket 210 about pivot 230.

The end of balance link 224 adjacent pivot 230 is pivotally coupled to one end of a rearmost roof bow coupler link 232 at pivot 234. An opposite end of coupler link 232 is pivotally coupled to an intermediate portion of a V-shaped rearmost roof bow drive link 236 at pivot 238. One end of drive link 236 is pivotally coupled to bracket 210 at pivot 240 (FIGS. 8-11) while the other end of drive link 236 is pivotally coupled to an end of a rearmost roof bow control link 242 at pivot 244. An opposite end of control link 242 is pivotally coupled to a front end of a rear portion 246 of segmented rearmost roof bow 212 at pivot 248. Front end of rear portion 246 is also pivotally coupled to a rear end of a front portion 250 of segmented rearmost roof bow 212 at pivot 252. A front end of front portion 250 is pivotally coupled to bracket 210 at pivot 254.

Figure 9:
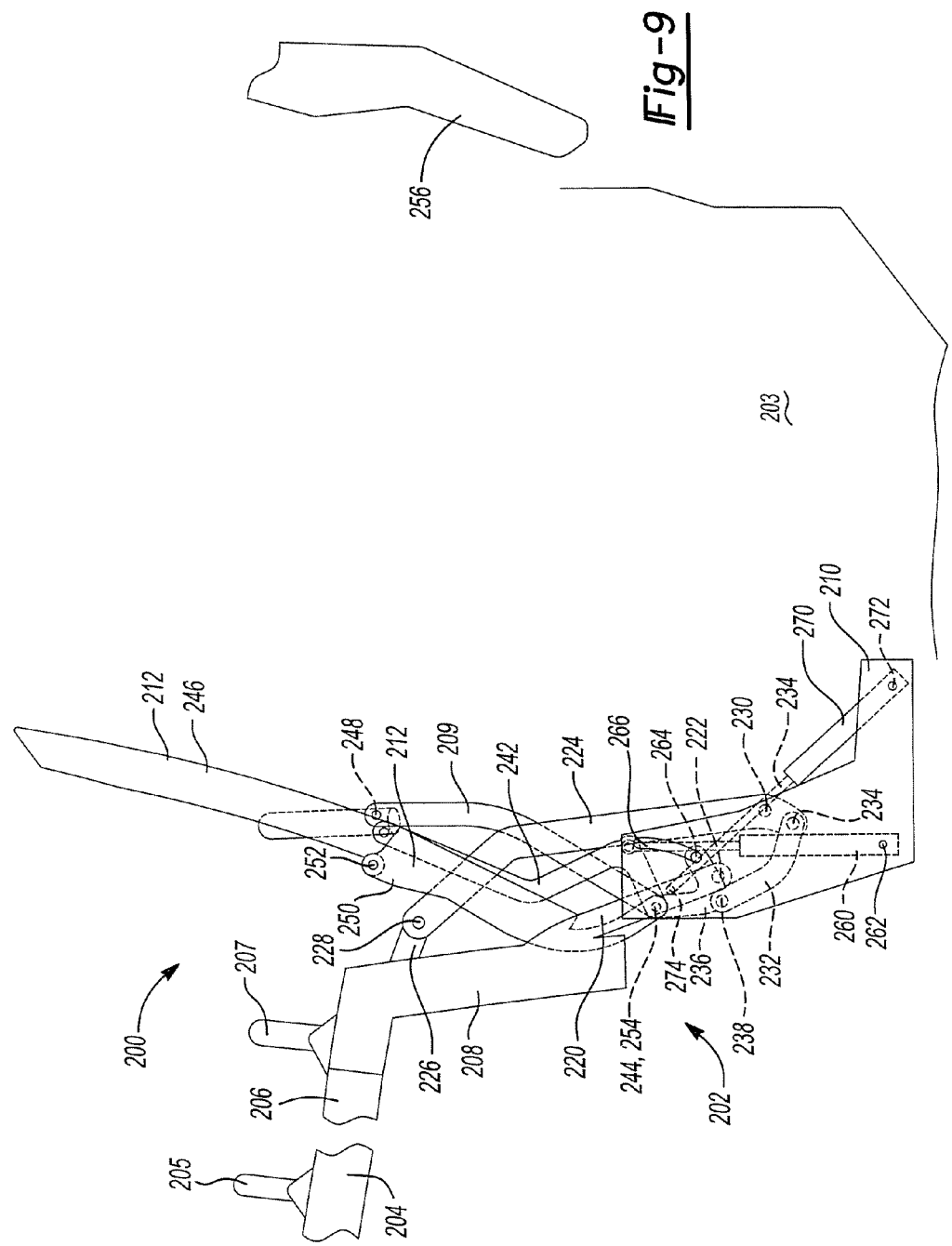
FIG. 9 is a fragmented side view of the convertible roof of FIG. 7 with the rearmost roof bow in a raised, generally vertical position.
Figure 10:
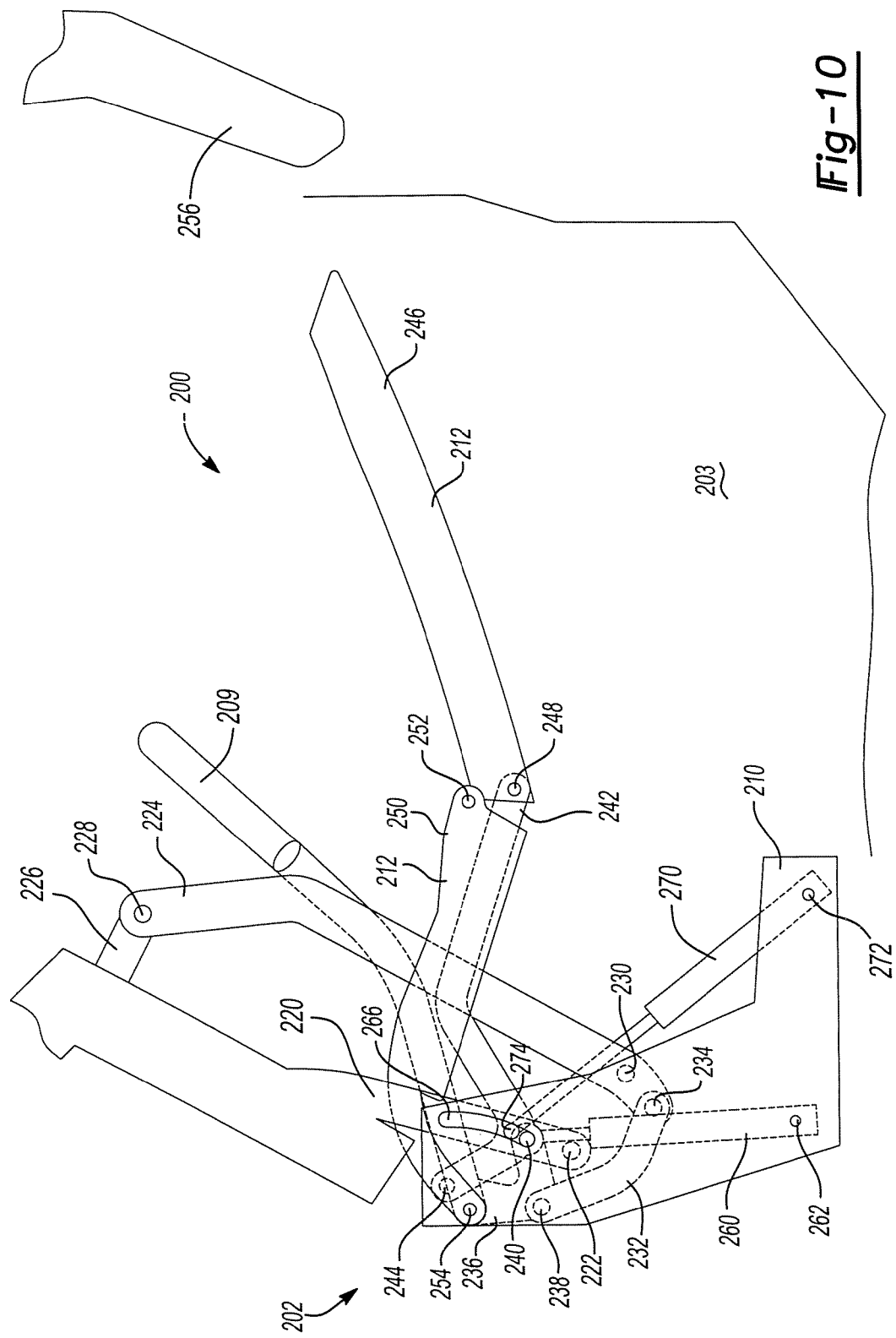
FIG. 10 is a fragmented side view of the convertible roof of FIG. 7 in an intermediate position during the retraction process.
Figure 11:
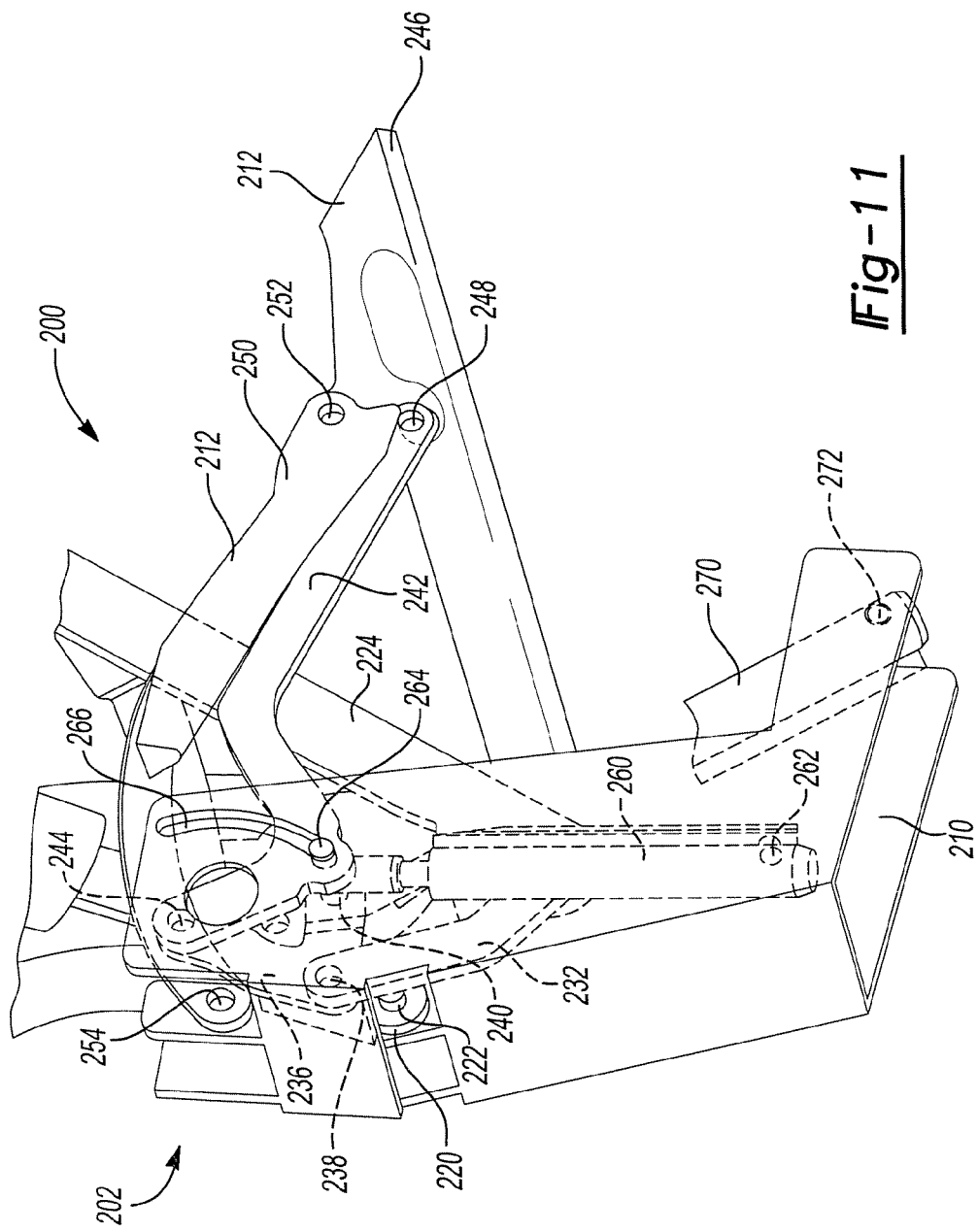
FIG. 11 is a fragmented perspective view of the top stack mechanism of FIG. 10.
Figure 12:
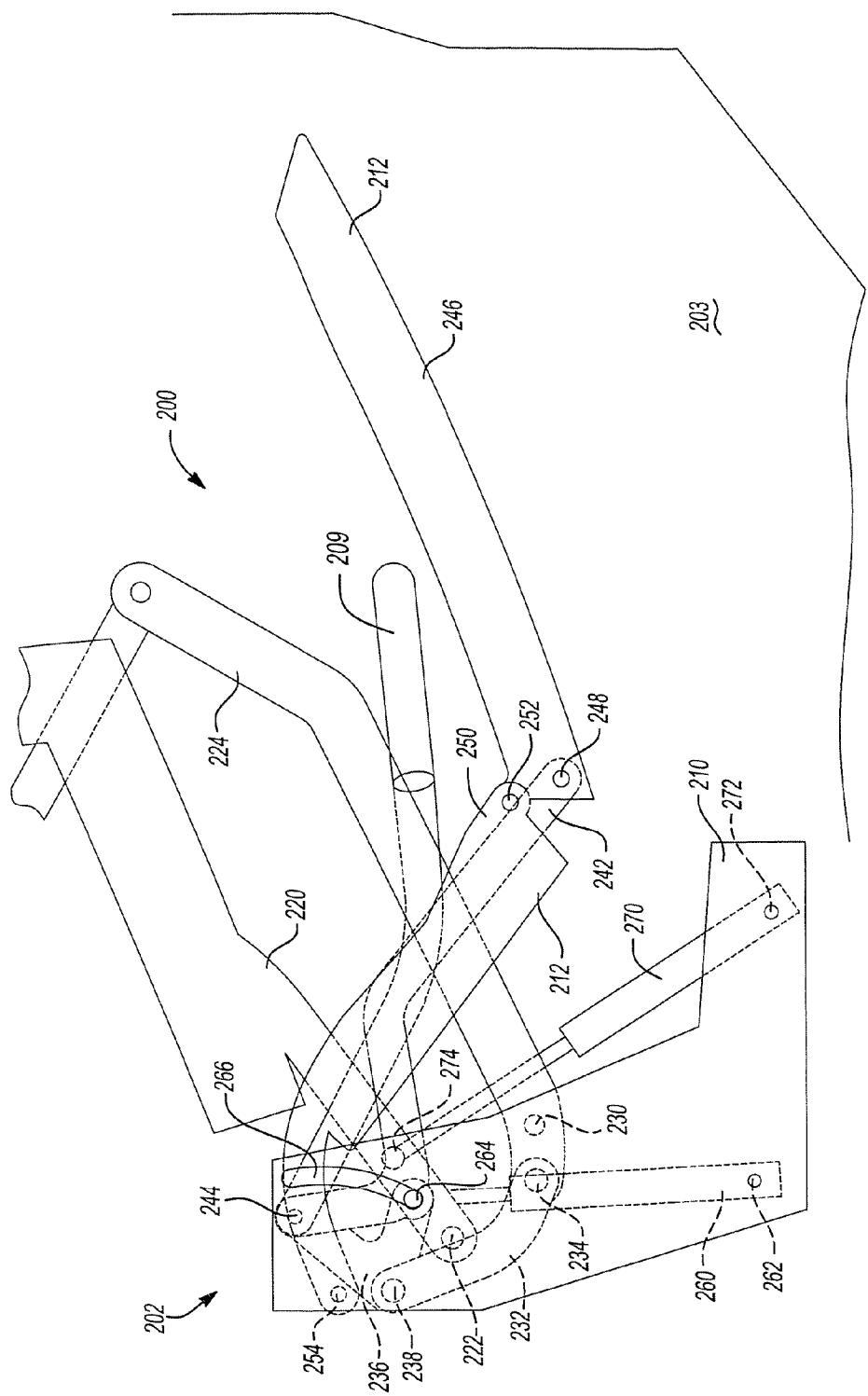
FIG. 12 is a fragmented side view of the convertible roof of FIG. 7 in another intermediate position during the retraction process.

Pivots 244 and 254 are aligned when convertible roof 200 is in the raised operative position, as shown in FIGS. 7 and 8. The alignment of pivots 244, 254 allows segmented rearmost roof bow 212 to be moved between the horizontal operative position, as shown in FIG. 7, to a raised position, as shown in FIG. 9, to allow a tonneau cover 256 to be opened and closed to allow the retraction and extension of convertible roof 200. During the movement of segmented rearmost roof bow 212, balance link 224 remains stationary which thereby holds coupler link 232 and drive link 236 stationary. The stationary nature of drive link 236 allows pivot 244 to act as a virtual ground pivot. During this movement, front and rear portions 250, 246 of segmented rearmost roof bow 212 remain aligned with one another and segmented rearmost roof bow 212 moves as a single piece (bar) rotationally about pivot 254. To accomplish this movement, one end of an automatic actuator 260 is pivotally coupled to bracket 210 at pivot 262. An opposite end of actuator 260 is pivotally coupled to an intermediate portion of control link 242 at pivot 264. Actuator 260 can be commanded to extend and retract to rotate segmented rearmost roof bow 212 between the horizontal and vertical positions about pivots 244, 254.

To aid in guiding this movement, pivot pin 264 can extend outwardly from control link 242 and travel along a slot 266 in bracket 210. The engagement of pivot pin 264 and slot 266 provides additional support and guidance for the movement of segmented rearmost roof bow 212 between the horizontal and vertical positions. Actuator 260 can be a fluidic actuator, such as a hydraulic or pneumatic cylinder.

To drive motion of convertible roof 200 between the raised, operative position and the stowed position, one end of an automatic actuator 270 is pivotally coupled to bracket 210 at pivot 272. An opposite end of actuator 270 is pivotally coupled to arm 220 of rear roof rail 208 at pivot 274 (shown in FIGS. 7, 9, and 10). Extension and retraction of actuator 270 can drive rotational movement of rear roof rail 208 about pivot 222 to move convertible roof 200 between the raised and stowed positions, as described below. Actuator 270 can be a fluidic actuator, such as a hydraulic or pneumatic cylinder.

In operation, to move convertible 200 between the raised, operative position, shown in FIG. 7, to the stowed position, shown in FIG. 13, segmented rearmost roof bow 212 is first moved from the horizontal position, shown in FIG. 7, to the generally vertical position, shown in FIG. 9. This movement of segmented rearmost roof bow 212 allows tonneau cover 256 to be moved to an open position to allow retraction of convertible roof 200 into stowage well 203 in the vehicle. To move segmented rearmost roof bow 212 to the generally vertical position, actuator 260 is commanded to extend which thereby pushes control link 242 and drives counterclockwise rotation of control link 242 about pivot 244. Because pivots 244, 254 are aligned, front portion 250 of segmented rearmost roof bow 212 also pivots counterclockwise about pivot 254. This synchronized counterclockwise rotation of control link 242 and front portion 250 maintain front and rear portions 250, 246 of segmented rearmost roof bow 212 aligned with one another such that they move as a single unitary piece.

Once segmented rearmost roof bow 212 is in its raised position, shown in FIG. 9, tonneau cover 256 can be moved to its open position. With tonneau cover 256 open, actuator 260 is commanded to retract to move segmented rearmost roof bow 212 back to its horizontal position, as shown in FIG. 7. The ends of slot 266 can function as stops for the movement of segmented rearmost roof bow 212 between the horizontal and vertical positions.

In the raised operating position, as shown in FIG. 7, pivot 240 is co-linear with pivot 264 since pivot 264 is in the bottom of slot 266. In this location, pivot 264 functions as a virtual ground pivot. Pivot 264 can be held in the bottom of slot 266 under the reaction force of segmented rearmost roof bow 212 and its associated linkages. Alternatively, pivot 264 can be held in the bottom of slot 266 by maintaining actuator 260 active and in the retracted state. To move convertible roof 200 from the raised operative position to the stowed position, actuator 270 is commanded to retract. The retraction of actuator 270 pulls on arm 220 of rear roof rail 208 and drives clockwise rotation of rear roof rail 208 about pivot 222. The rotation of rear roof rail 208 drives rotation of balance link 224 clockwise about pivot 230. The rotation of balance link 224 drives coupler link 232 forwardly and upwardly which, in turn, drives rotation of drive link 236 clockwise about pivot 240. Thus, a four-bar linkage assembly is formed by balance link 224, coupler link 232, drive link 236, and bracket 210 and is defined by pivots 230, 234, 238, and 240. Rotation of drive link 236 causes pivot 244 to rotate relative to pivot 240 and moves pivot 244 such that it is no longer aligned with pivot 254.

Rotation of drive link 236 about pivot 240 drives clockwise rotation of control link 242 about pivot 244. The movement of control link 242 drives rotation of front portion 250 of segmented rearmost roof bow 212 clockwise about pivot 254. This movement of control link 242 and front portion 250 causes rear portion 246 of segmented rearmost roof bow 212 to rotate counterclockwise relative to front portion 250 and control link 242 about pivots 252, 248, respectively. The relative rotation of front and rear portions 250, 246 about pivot 252 causes front and rear portions 250, 246 to become unaligned and fold relative to one another into the position shown in FIG. 13. When top stack mechanism 202 is moved to the fully retracted state, as shown in FIG. 13, actuator 270 is commanded to stop retracting and tonneau cover 256 can be moved to its generally horizontal, operative position.

In the retracted position, segmented rearmost roof bow 212 has a shortened fore-and-aft length $L_{202}$ between the front and rearmost ends of either front or rear portions 250, 246. The shortened length $L_{202}$ enables convertible roof 200 to be stowed more compactly and fit into a smaller stowage well 203 than would be capable if rearmost roof bow 212 were not segmented (i.e., stowage well 203 would have to extend rearwardly a significantly longer distance). To move convertible roof 200 from the stowed position to the raised operative position, the opposite steps are performed.

Thus, in convertible roof 200, the effective fore-and-aft length of segmented rearmost roof bow 212 contracts as top stack mechanism 202 folds and moves into stowage well 203. The contracting of the rearmost roof bow allows convertible roof 200 to fit in a narrow fore-and-aft body opening of stowage well 203.

Figure 14:
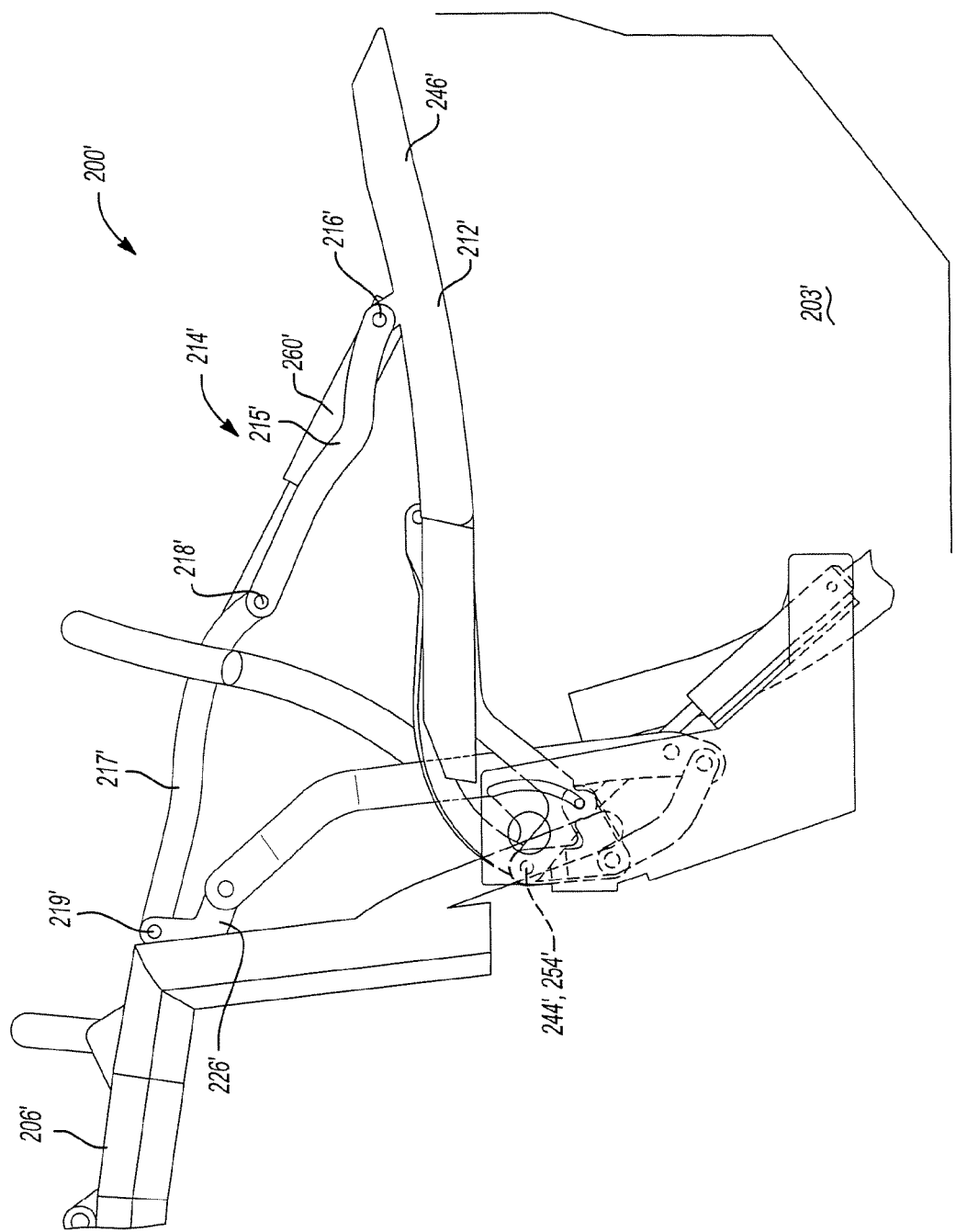
FIGS. 14 and 15 are fragmented side views of an alternate linkage assembly for the convertible roof of FIG. 7 wherein a buggy link assembly is utilized to move the rearmost roof bow from a horizontal to a raised, generally vertical position.
Figure 15:
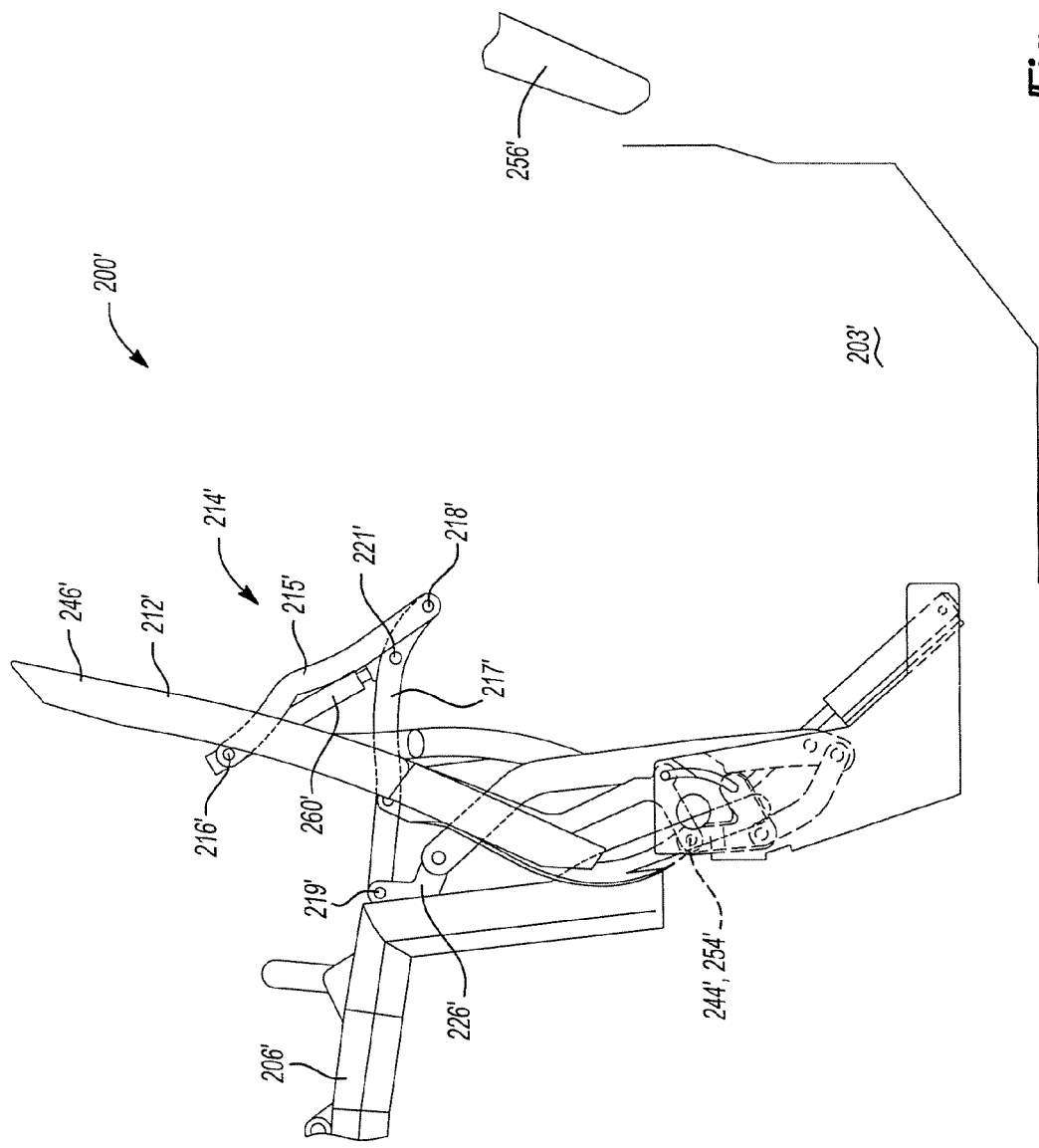

Referring now to FIGS. 14 and 15, an alternate convertible roof 200' that utilizes an alternate linkage assembly 214' to move a portion of a segmented rearmost roof bow 212' between a generally horizontal, operative position and a raised, generally vertical position is shown. Linkage assembly 214' is a buggy link assembly. Convertible roof 200' is essentially the same as convertible roof 200 with the difference being the manner in which segmented rearmost roof bow 212' is moved to allow tonneau cover 256' to open and close.

In convertible roof 200', linkage assembly 214' includes a first link 215' having one end which is pivotally coupled to an intermediate section of rear portion 246' of segmented rearmost roof bow 212' at pivot 216'. An opposite end of first link 215' is pivotally coupled to a second link 217' at pivot 218'. An opposite end of second link 217' is pivotally coupled to arm 226' of center roof rail 206' at pivot 219'. In convertible roof 200', one end of actuator 260' is pivotally coupled to an intermediate section of rear portion 246' at pivot 216'. The opposite end of actuator 260' is pivotally coupled to an intermediate portion of second link 217' at pivot 221'. This arrangement allows actuator 260' to be extended and retracted to cause segmented rearmost roof bow 212' to move between the generally horizontal, operative position, as shown in FIG. 14, to a generally vertical position, as shown in FIG. 15. In the generally vertical position, tonneau cover 256' can be moved from a horizontal position to a raised position (as shown) to thereby allow convertible roof 200' to be moved to the stowed position.

To move segmented rearmost roof bow 212', actuator 260' is commanded to retract. The retraction of actuator 260' drives counterclockwise rotation of first link 215' relative to second link 217' about pivot 218'. This relative rotation drives segmented rearmost roof bow 212', which moves as a single unitary piece, about virtual fixed and aligned pivots 244', 254' as discussed above with reference to convertible roof 200. To move segmented rearmost roof bow 212' back to the horizontal and operative position, actuator 260' is commanded to extend. The retraction of convertible roof 200' into stowage well 203' and the shortening of the length of segmented rearmost roof bow 212' is essentially the same as that discussed above with reference to convertible roof 200. Accordingly, further details of convertible roof 200' are not provided. During retraction and extension of convertible roof 200', actuator 260' is deactivated and can extend and retract freely. Linkage assembly 214' can be in an over-center position to hold segmented rearmost roof bow 212' against the top of tonneau cover 256'.

Referring now to FIGS. 16-23, a convertible roof 300 is shown on a vehicle 320. Convertible roof 300 is similar to convertible roof 200 described above with the main difference being the configuration of segmented rearmost roof bow 312. Specifically, rear portion 346 is different than rear portion 246 shown and discussed above with reference to convertible roof 200. In particular, rear portion 346 includes a transversely extending central segment 378 having a generally triangular segment 380 on either end thereof. Triangular segments 380 include a fore-and-aft extending segment 382, a transversely extending segment 384, and a connecting segment 385 that interconnects segments 382, 384 and extends transversely across vehicle 320. Connecting segment 385 defines an outer periphery of triangular segments 380 and rear portion 346 of segmented rearmost roof bow 312. Additionally, in convertible roof 300, number four roof bow 309 is pivotally coupled to central segment 378 at pivot 388. A backlight 390 can be disposed in roof cover 392 between central segment 378 and number four roof bow 309. The bottom edge of backlite 390 is substantially aligned with pivot 388.

Rear portion 346 of convertible roof 300 is coupled to a front portion 350 of rearmost segmented roof bow 312 of top stack mechanism 302. Top stack mechanism 302 is essentially the same as top stack mechanism 202 with the replacement of number four roof bow 209 and rear portion 246 with rear portion 346 and the associated number four roof bow 309 described above. Accordingly, all of the details of top stack mechanism 302 will not be discussed. Pivot 388 and its associated axis are aligned with pivot 352 and its associated axis which couples front and rear portions 350, 346 of segmented rearmost roof bow 312 together.

Figure 16:
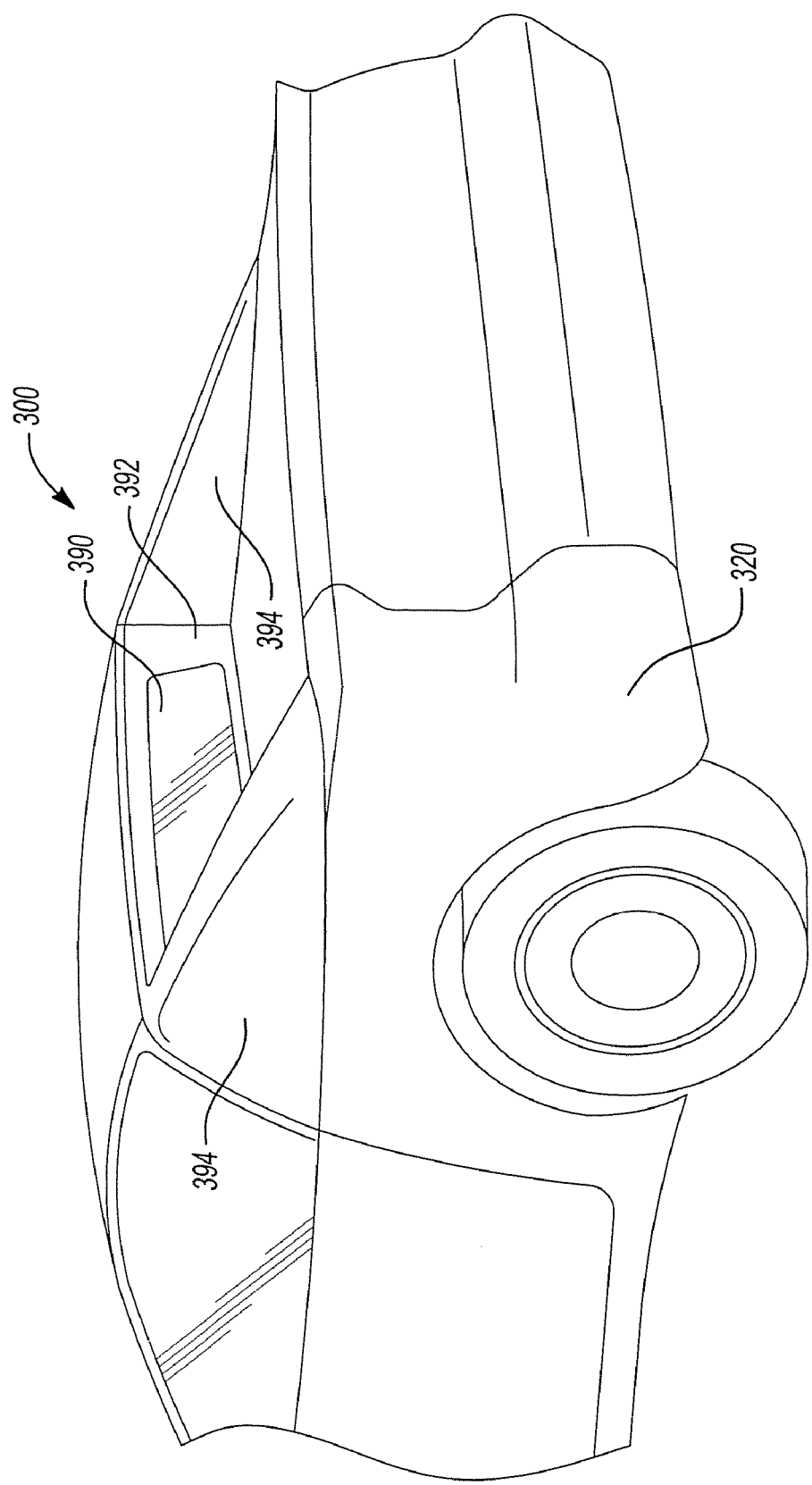
FIG. 16 is a fragmented rear perspective view of a vehicle having another convertible top according to the present teachings.
Figure 17:
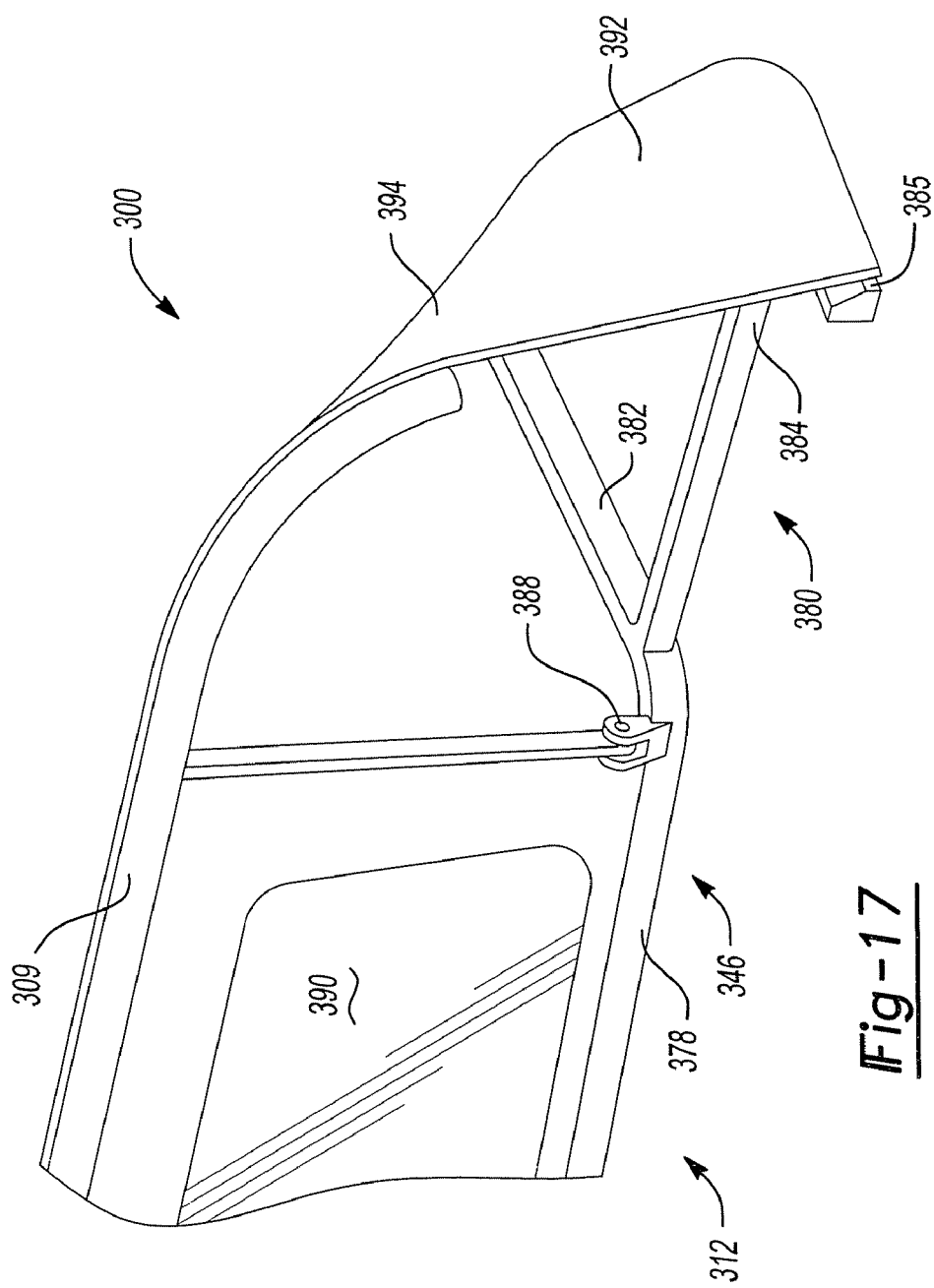
FIG. 17 is a fragmented perspective view of a rear portion of the segmented rearmost roof bow utilized in the convertible roof of FIG. 16 showing the configuration to obtain the buttress design for the convertible roof.
Figure 18:
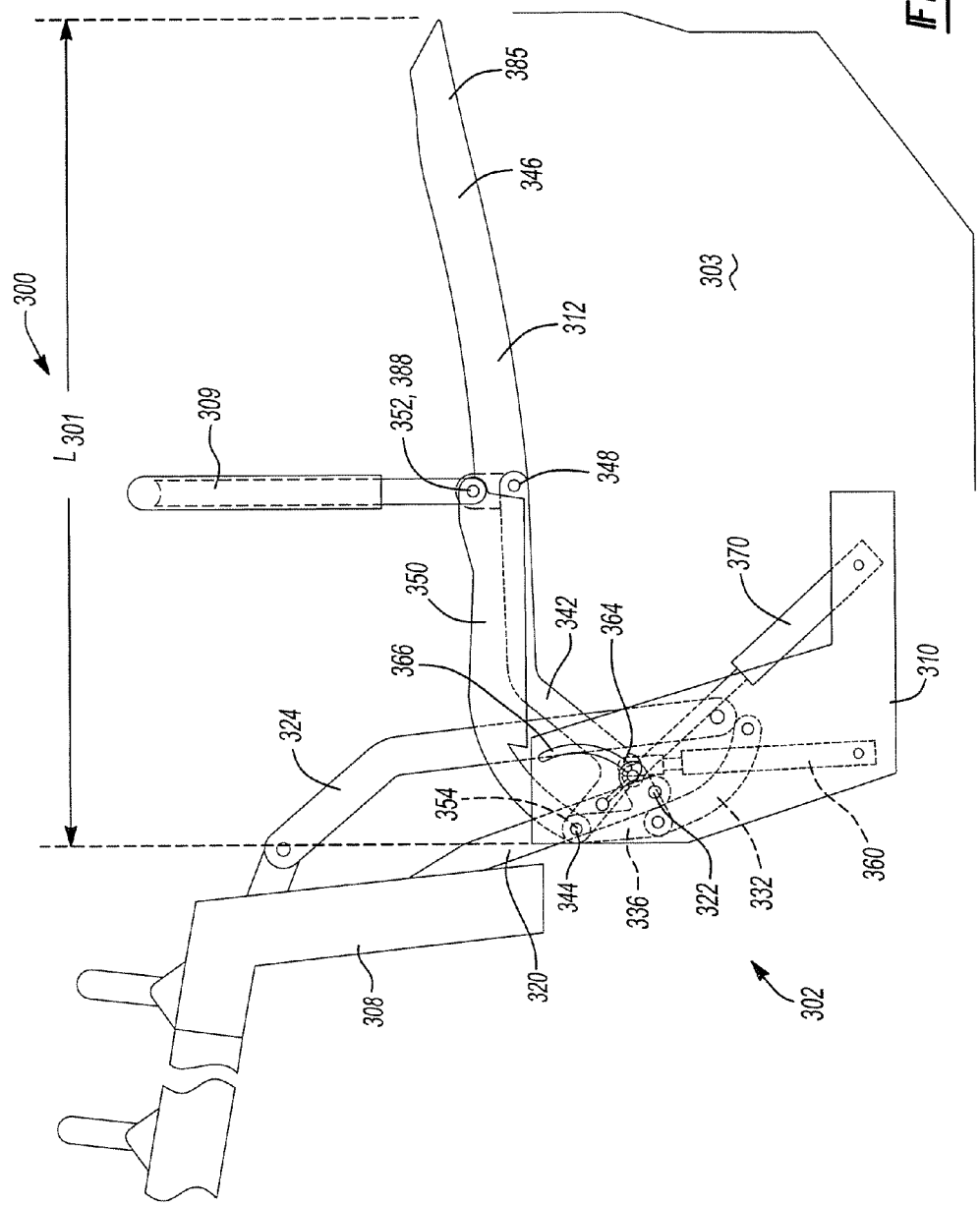
FIG. 18 is a fragmented side view of the convertible roof of FIG. 16 with a third embodiment of a top stack mechanism according to the present teachings in the fully raised operative position.
Figure 19:
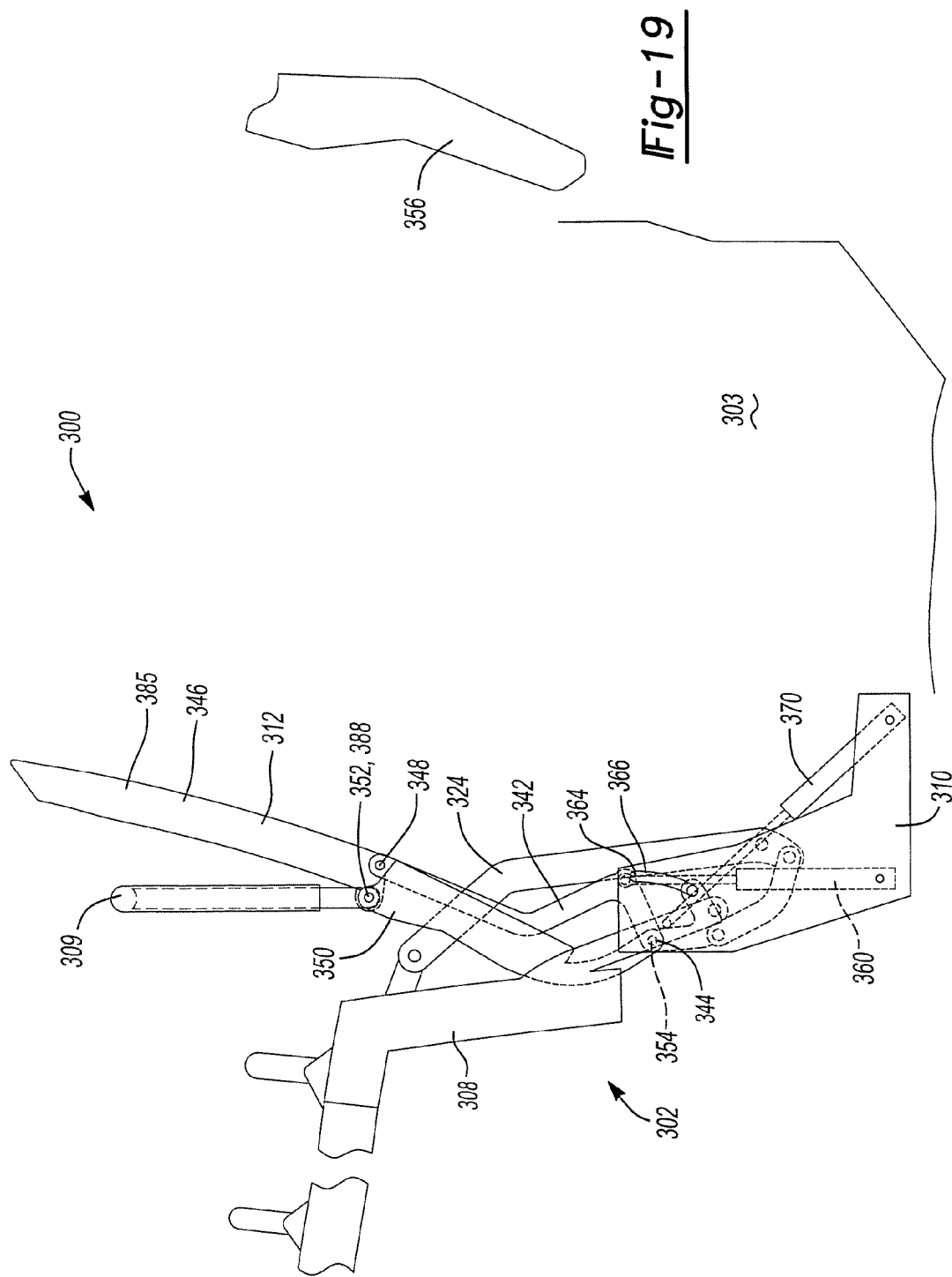
FIG. 19 is a fragmented side view of the convertible roof of FIG. 16 with the rearmost roof bow in a raised, generally vertical position.
Figure 20:
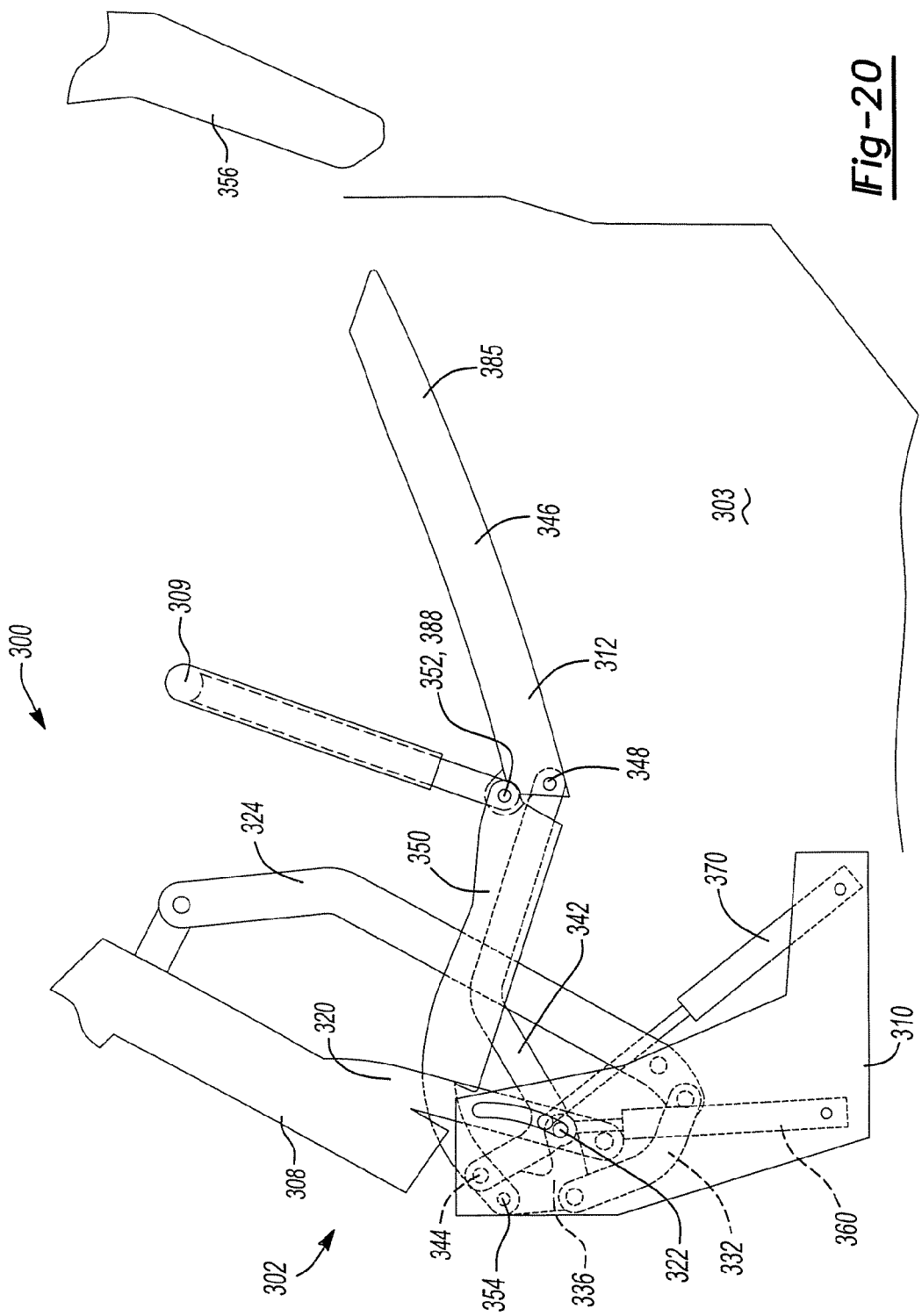
FIGS. 20 and 21 are fragmented side views of the convertible roof of FIG. 16 in intermediate positions during the retraction process.
Figure 21:
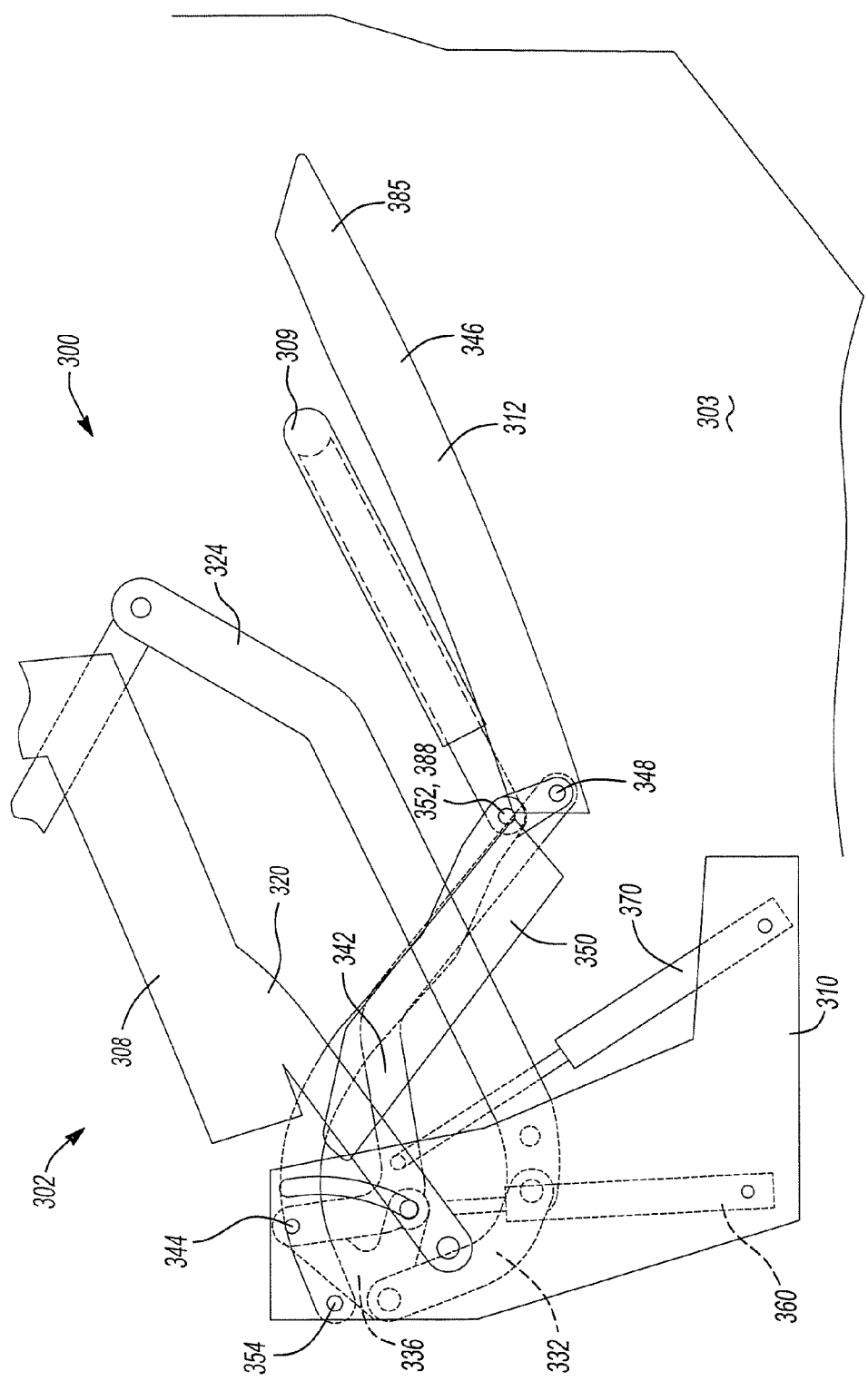

Rear portion 346 can be moved from a generally horizontal, operative position, as shown in FIGS. 16 and 18, to a generally vertical raised position, as shown in FIG. 19, to allow tonneau cover 356 to move between an open and closed position thereby allowing convertible roof 300 to be moved to the stowed position in stowage well 303, as shown in FIGS.

22 and 23. Additionally, rear portion 346 of segmented rearmost roof bow 312 can articulate relative to front portion 350 while moving to a stowed position, as shown in FIGS. 20-23, and thereby change the associated fore-and-aft length between $L_{301}$ and $L_{302}$, in the same manner discussed above with reference to convertible roof 200.

To move segmented rearmost roof bow 312 from the horizontal operative position to the vertical raised position, actuator 360 is commanded to extend. During the extension of actuator 360, balance link 324 remains stationary which thereby holds coupler link 332 and drive link 336 stationary. The stationary nature of drive link 336 allows pivot 344 to act as a virtual ground pivot. During this movement, front and rear portions 350, 346 of segmented rearmost roof bow 312 remain aligned with one another and segmented rearmost roof bow 312 moves as a single piece (bar) rotationally about pivot 354. To aid in guiding this movement, pivot pin 364 can extend outwardly from control link 342 and travel along slot 366 in bracket 310. The engagement of pivot pin 346 and slot 366 provides additional support and guidance for the movement of segmented rearmost roof bow 312 between the horizontal and vertical positions. Actuator 360 can be a fluidic actuator, such as a hydraulic or pneumatic cylinder.

Once segmented rearmost roof bow 312 is in its raised position, as shown in FIG. 19, tonneau cover 356 can be moved to its open position. With tonneau cover 356 open, actuator 360 is commanded to retract to move segmented rearmost roof bow 312 back to its horizontal position, as shown in FIG. 18. The ends of slot 366 can function as stops for the movement of segmented rearmost roof bow 312 between the horizontal and vertical positions.

Figure 22:
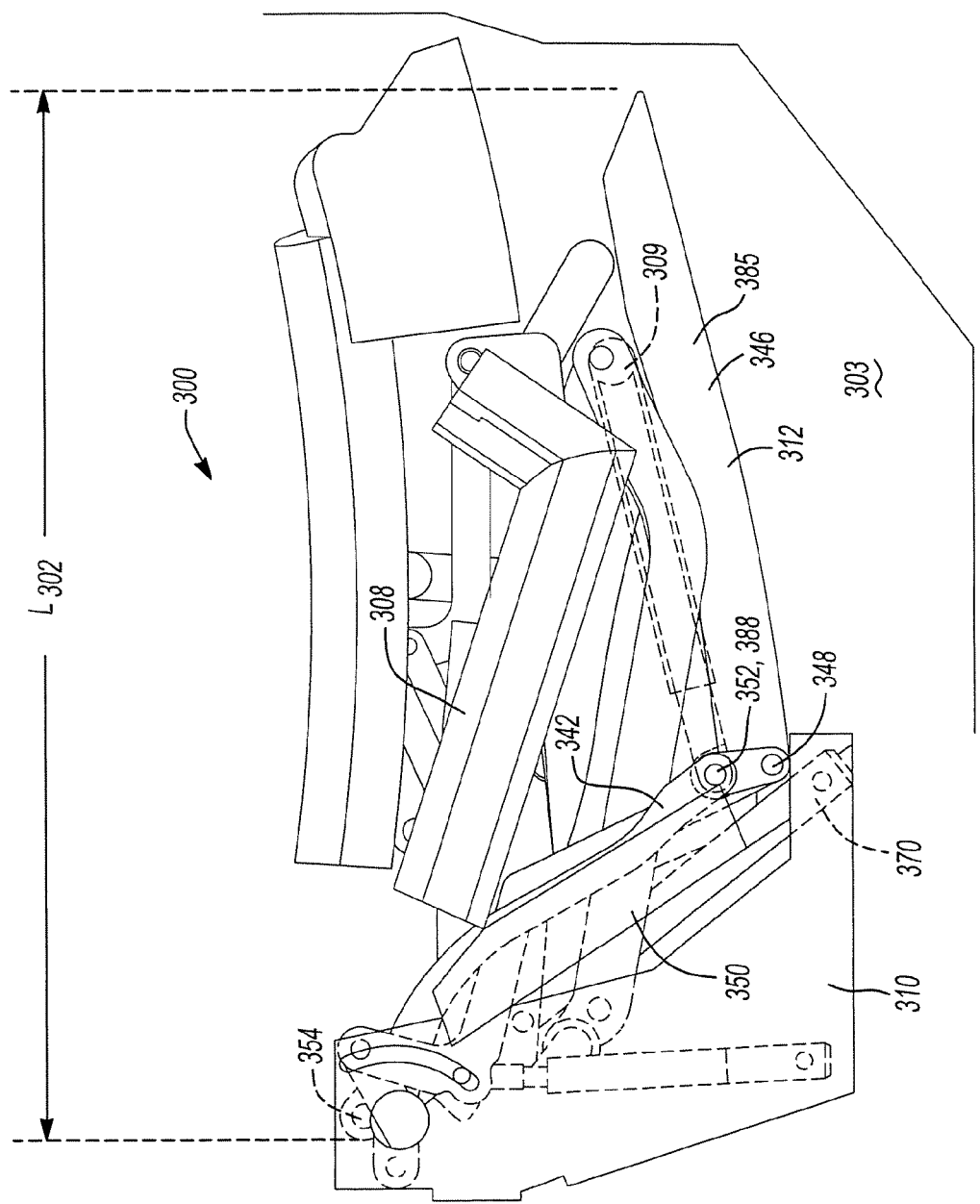
FIG. 22 is a fragmented side view of the convertible roof of FIG. 16 in the stowed position.
Figure 23:
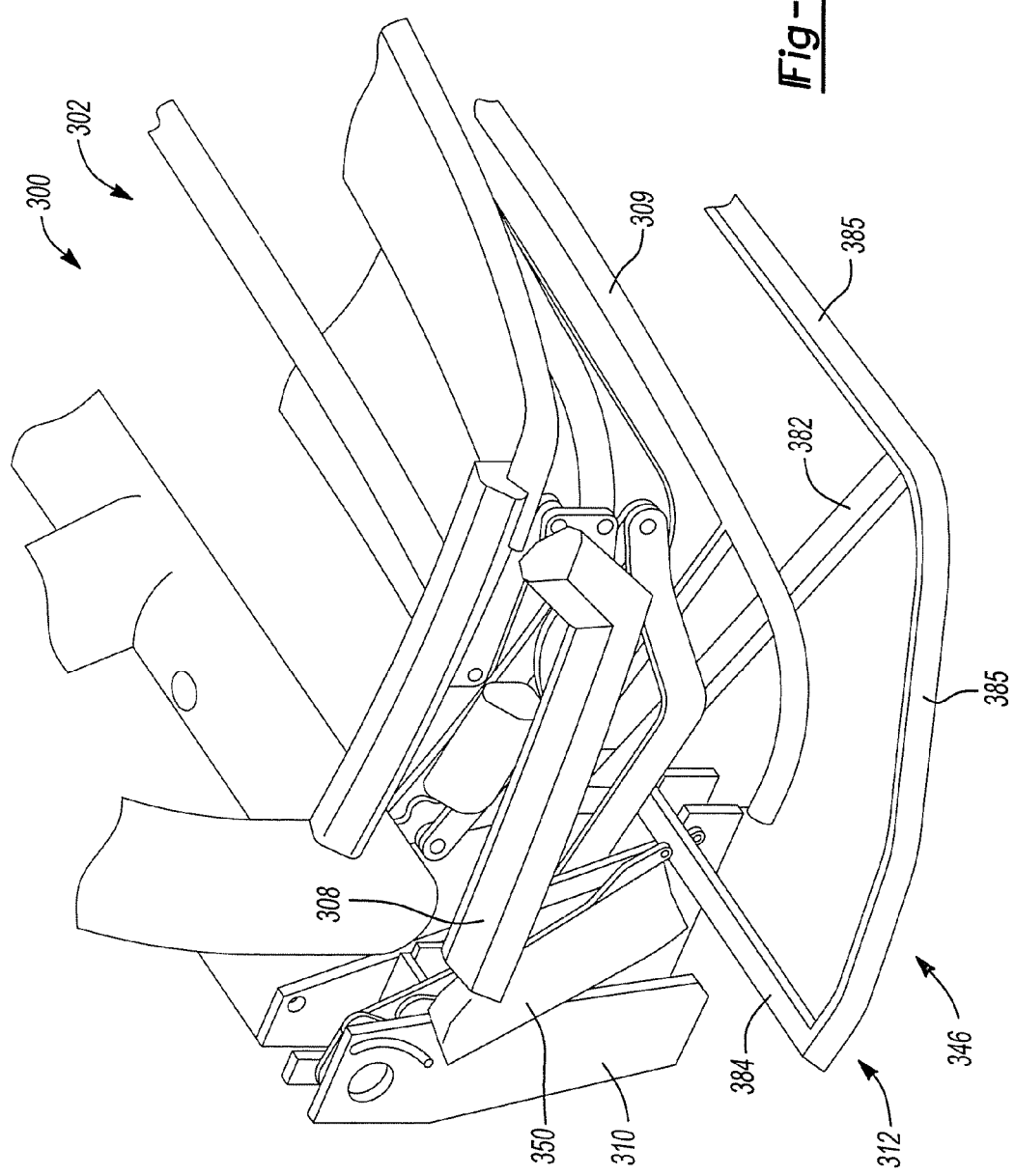
FIG. 23 is a fragmented perspective view of the convertible roof of FIG. 16 in the stowed position.

To move convertible roof 300 from the raised operative position to the stowed position, actuator 370 is commanded to retract. The retraction of actuator 370 pulls on arm 320 of rear roof rail 308 and drives clockwise rotation of rear roof rail 308 about pivot 322 which, in turn, drives movement of the four-bar linkage assembly formed by balance link 324, coupler link 332, drive link 336, and bracket 310. Rotation of drive link 336 drives clockwise rotation of control link 342 about pivot 344. The movement of control link 342 drives rotation of front portion 350 of segmented rearmost roof bow 312 clockwise about pivot 354. This movement of control link 342 and front portion 350 causes rear portion 346 of segmented rearmost roof bow 312 to rotate counterclockwise relative to front portion 350 and control link 342 about pivots 352, 348, respectively. The relative rotation of front and rear portions 350, 346 causes front and rear portions 350, 346 to become unaligned and fold relative to one another into the position shown in FIGS. 22 and 23. When top stack mechanism 302 is moved to the fully retracted state, as shown in FIGS. 22 and 23, actuator 370 is commanded to stop retracting and tonneau cover 356 can be moved to its generally horizontal, operative position.

In the retracted position, number four roof bow 309 is adjacent rear portion 346. Additionally, segmented rearmost roof bow 312 has a shortened fore-and-aft length $L_{302}$ between the front and rearmost ends of either front or rear portions 350, 346. The shortened length $L_{302}$ enables convertible roof 300 to be stowed more compactly and fit into a smaller stowage well 303 than would be capable if rearmost roof bow 312 were not segmented. To move convertible roof 300 from the stowed position to the raised operative position, the opposite steps are performed.

Convertible roof 300 can provide a unique and visually distinctive exterior appearance for the vehicle. In particular, as shown in FIG. 16, the configuration of rear portion 346 can provide a flying buttress design wherein buttresses 394 are disposed along either side of the vehicle. Additionally, in convertible roof 300, backlite 390 can be substantially vertically oriented when convertible roof 300 is in the raised operative position.

The convertible roofs disclosed herein can advantageously allow a longer sail panel for the convertible roof without requiring a corresponding increase in the length of the stowage well. The longer sail panel can provide an aesthetically pleasing fastback appearance. The convertible roofs can advantageously pull the rearmost roof bow forwardly when moving to a stowed position which can preserve the vehicle deck lid that is used on a fixed roof version of the vehicle. The rearmost roof bow can reside substantially at the vehicle belt line when the convertible roof is in the raised operative position and can be substantially disposed below the belt line when the convertible roof is in the stowed position. Additionally, a traditional buggy link assembly can advantageously be used with the segmented rearmost roof bow to move same to allow for movement of a tonneau cover and to hold the rearmost roof bow in the operative position against the tonneau cover.

It should be appreciated that, while the convertible roofs disclosed herein are shown with reference to specific examples and configurations, variations in the convertible roofs shown can be employed without departing from the spirit and scope of the present teachings. For example, it should be appreciated that the linkage assemblies and the links used herein can be configured in different arrangements and different shapes to provide a desired retraction and packaging of the convertible roofs. Additionally, the location and number of the pivots can also vary to provide for a desired packaging of the convertible roofs. Moreover, while linear actuators are shown, it should be appreciated that rotary actuators and/or electric motors may also be employed to drive the motion of the linkages of the convertible roofs shown.

Furthermore, it should be appreciated that the actuators can be controlled by an electronic control unit. Additionally, devices such as limit switches, sensors, and/or potentiometers can be coupled to the body of the vehicle, the tonneau cover, any obstruction-detecting devices, and the convertible roof to inform the control unit of the position of these components and their various linkages to ensure that the various components do not interfere with one another and that the convertible roof and its associated actuators are properly controlled to move between the raised and stowed positions. An example of a suitable control system for the convertible roof, the vehicle and the various components thereon is that disclosed in U.S. Pat. No. 6,288,511, entitled "Automotive Convertible Top System," issued to Porter et al. and assigned to the assignee of the present invention, the disclosure of which is incorporated by reference herein.

Furthermore, it should be appreciated that, while the convertible roofs herein are shown as being automatically actuated, the present teachings can be utilized with manually operated convertible roofs. Moreover, it should also be appreciated that other roof bows can be segmented to reduce their effective length and provide a more compact stowage for the convertible roof, although all the advantages of the present teachings may not be realized. Additionally, it should be appreciated that the segmented roof bow can be a rearmost roof bow that is internal to the convertible roof (i.e., does not reside on the top of the exterior of the vehicle, such as on a tonneau cover) and still provide improved packaging efficiency. Also additionally, the convertible roofs disclosed herein may be used without a tonneau cover. Thus, one skilled in the art will readily recognize from such teachings and from the accompanying drawings and claims that various changes, modifications, and variations can be made therein without departing from the spirit and scope of the present teachings.

What is claimed is:

1. An automotive vehicle convertible roof comprising a top stack mechanism moveable between a raised position and a stowed position, said top stack mechanism including:
a least one longitudinally extending roof rail; and
a plurality of transversely extending roof bows,
wherein at least one of said roof bows extends rearwardly a first distance when said top stack mechanism is in said raised position and extends rearwardly a second distance less than said first distance when said top stack mechanism is in said stowed position and a portion of said at least one of said roof bows extends rearwardly beyond a vehicle stowage well when said top stack mechanism is in said raised position and is substantially disposed in said vehicle stowage well when said top stack mechanism is in said stowed position;
wherein said at least one of said roof bows is a segmented roof bow having first and second portions that articulate relative to one another thereby changing a length of said segmented roof bow, and wherein said first and second portions articulate relative to one another during movement of said at least one roof rail.

2. The convertible roof of claim 1, wherein said at least one of said roof bows is a rearmost roof bow.

3. The convertible roof of claim 1, wherein said at least one of said roof bows extends said first distance when being substantially at or above a vehicle belt line and extends said second distance when being substantially below the vehicle belt line.

4. The convertible roof of claim 1, further comprising a tonneau cover movable between said raised and lowered positions to allow access to said stowage well, and a storage space and associated lid located behind said roof stowage well and tonneau cover.

5. The convertible roof of claim 1, wherein said top stack mechanism further comprises:
a linkage assembly, a balance link and a hydraulic actuator;
said at least one roof rail comprises a front roof rail, a center roof rail and a rear roof rail;
said linkage assembly pivotally coupling said front roof rail to said center roof rail;
said balance link being pivotally coupled to said center roof rail; and
said actuator operably moving said rear roof rail which causes movement of said top stack mechanism between said raised and stowed positions.

6. The convertible roof of claim 1, further comprising an automatic actuator operably moving said segmented roof bow even when said roof rail remains stationary.

7. An automotive vehicle convertible roof comprising:
a cover;
a top stack mechanism operable between a raised position and a stowed position, said top stack mechanism being coupled to said cover and including:
a roof rail;
a plurality of roof bows; and
a buggy link assembly operable to move at least one of said roof bows between first and second positions while said roof rail remains stationary,
wherein said roof bow moved by said buggy link assembly is a segmented roof bow having first and second portions that articulate relative to one another thereby changing a length of said segmented roof bow and said first and second portions remain stationary relative to one another when being moved by said buggy link assembly.

8. The convertible roof of claim 7, wherein said segmented roof bow is a rearmost one of said roof bows and has a first longitudinal length when said top stack mechanism is in said raised position and a second longitudinal length less than said first longitudinal length when said top stack mechanism is in said stowed position.

9. The convertible roof of claim 7, further comprising a rigid backlite attached to said cover which is a pliable material.

10. The convertible roof of claim 7, further comprising a roof stowage well receiving said top stack mechanism when in its stowed position, and a tonneau cover movable between said raised and lowered positions to allow access to said stowage well, and a storage space and an associated lid located behind said roof stowage well and tonneau cover.

11. The convertible roof of claim 7, wherein said top stack mechanism further comprises:
a linkage assembly, a balance link and a hydraulic actuator;
said roof rail comprises a front roof rail, a center roof rail and a rear roof rail;
said linkage assembly pivotally coupling said front roof rail to said center roof rail;
said balance link being pivotally coupled to said center roof rail; and
said actuator operably moving said rear roof rail which causes movement of said top stack mechanism between said raised and stowed positions.

12. The convertible roof of claim 7, further comprising an automatic actuator operably moving said segmented roof bow even when said roof rail remains stationary.

13. A method of operating a convertible roof, the method comprising:
(a) covering a vehicle passenger compartment with a top stack mechanism in a raised operative position, said top stack mechanism having a roof bow with a first longitudinal length when in said raised position;
(b) changing a length of said roof bow; and
(c) stowing said top stack mechanism in a stowed position in a stowage well with said roof bow having a second longitudinal length less than said first longitudinal length,
wherein (b) includes changing said length of said roof bow by moving an entirety of said roof bow from a first position substantially at a vehicle belt line to a second position substantially above said vehicle belt line.

14. The method of claim 13, further comprising maintaining said roof bow at a reduced length as a roof rail moves from a raised position to a stowed position.

15. The method of claim 13, further comprising pivoting a tonneau cover between said raised and lowered positions to allow convertible roof access to said stowage well which is located in front of a storage space.

16. The method of claim 13, further comprising:
(a) moving a front roof rail relative to a rear roof rail of said top stack mechanism;
(b) moving a center roof rail relative to a rear roof rail of said top stack mechanism;
(c) pivoting a balance link connected to one of said roof rails; and
(d) actuating a fluidic cylinder to drive said rear roof rail.

17. The method of claim 13, further comprising actuating a fluidic cylinder to change the length of said roof bow even when a roof rail of said top stack mechanism is stationary.

18. A method of operating a convertible roof, the method comprising:
- aligning first and second portions of a roof bow with one another to have a first longitudinal length when covering a passenger compartment;
- moving said first and second portions relative to one another to be adjacent wherein both the first and second portions extend fore and aft side by side and have a second longitudinal length less than said first longitudinal length when stowed in a stowage well; and
- maintaining a roof rail stationary while moving said first and second portions relative to one another.

19. The method of claim 18, further comprising moving said first and second portions relative to one another while moving a roof rail between a raised position and a stowed position.

20. The method of claim 18, further comprising moving said first and second portions relative to one another simultaneous with moving the convertible roof between raised and stowed positions.

21. The method of claim 18, wherein said roof bow is a rearmost roof bow.

22. A method of operating a convertible roof, the method comprising:
- aligning first and second portions of a roof bow with one another to have a first longitudinal length when covering a passenger compartment;
- moving said first and second portions relative to one another to be adjacent wherein both the first and second portions extend fore and aft side by side and have a second longitudinal length less than said first longitudinal length when stowed in a stowage well; and
- moving said roof bow from a first generally horizontal position to a second generally vertical position while simultaneously moving said first and second portions relative to one another to be adjacent.

23. The method of claim 22, further comprising maintaining a roof rail stationary while moving said first and second portions relative to one another.

24. The method of claim 22, wherein said roof bow is a rearmost roof bow.

25. The method of claim 22, further comprising:
(a) moving a front roof rail relative to a rear roof rail;
(b) moving a center roof rail relative to the rear roof rail;
(c) pivoting a balance link connected to one of said roof rails; and
(d) actuating a fluidic cylinder to drive said rear roof rail.

26. The method of claim 22, further comprising actuating a fluidic cylinder to change the length of said roof bow even when a roof rail of a top stack mechanism is stationary.

* * * * *